(12) United States Patent
Wang et al.

(10) Patent No.: US 11,714,266 B2
(45) Date of Patent: Aug. 1, 2023

(54) PROJECTION LENS

(71) Applicant: ZHEJIANG SUNNY OPTICAL, CO., LTD, Zhejiang (CN)

(72) Inventors: Xinquan Wang, Zhejiang (CN); Lin Huang, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 331 days.

(21) Appl. No.: 16/644,966

(22) PCT Filed: Nov. 8, 2018

(86) PCT No.: PCT/CN2018/114515
§ 371 (c)(1),
(2) Date: Mar. 6, 2020

(87) PCT Pub. No.: WO2019/169889
PCT Pub. Date: Sep. 12, 2019

(65) Prior Publication Data
US 2020/0400928 A1    Dec. 24, 2020

(30) Foreign Application Priority Data
Mar. 9, 2018 (CN) .......................... 201810195485.2

(51) Int. Cl.
*G02B 13/18* (2006.01)
*G02B 13/00* (2006.01)
(Continued)

(52) U.S. Cl.
CPC .......... *G02B 13/18* (2013.01); *G02B 13/0035* (2013.01); *G02B 27/4205* (2013.01); *G03B 21/145* (2013.01)

(58) Field of Classification Search
CPC .......................... G02B 13/18; G02B 13/0035; G02B 27/4205; G02B 9/12; G02B 9/14;
(Continued)

(56) References Cited

U.S. PATENT DOCUMENTS 1,035,408 A * 8/1912 Beck et al. ........ G02B 13/0035
359/785
1,880,393 A * 10/1932 Altman .................. G02B 13/00
359/789
(Continued)

FOREIGN PATENT DOCUMENTS

CN      201965289 U    9/2011
CN      107505689 A    12/2017
(Continued)

*Primary Examiner* — James R Greece
(74) *Attorney, Agent, or Firm* — Gang Yu

(57) ABSTRACT

The disclosure discloses a projection lens, which sequentially includes a first lens, a second lens and a third lens from an image source side to an imaging side along an optical axis. The first lens has a positive refractive power, and a surface near the image source side thereof is a convex surface. The second lens has a positive refractive power or negative refractive power. The third lens has a positive refractive power is a meniscus lens of which a surface near the imaging side is a convex surface. An image source height ImgH of the projection lens and a total effective focal length f of the projection lens meet ImgH/f<0.2.

21 Claims, 12 Drawing Sheets

(51) Int. Cl.
*G02B 27/42* (2006.01)
*G03B 21/14* (2006.01)

(58) Field of Classification Search
CPC ...... G02B 13/002; G02B 5/18; G02B 5/1876;
G02B 5/189; G02B 5/1895; G02B
5/1814; G03B 21/145; G03B 21/142
USPC ....... 359/649, 651, 716, 737, 741, 742, 784,
359/785, 792
See application file for complete search history.

(56) References Cited

U.S. PATENT DOCUMENTS

| | | | | | |
|---|---|---|---|---|---|
| 1,937,168 | A | * | 11/1933 | Repp | G02B 13/00 |
| | | | | | 359/785 |
| 1,987,878 | A | * | 1/1935 | Tronnier | G02B 13/00 |
| | | | | | 359/740 |
| 2,388,869 | A | * | 11/1945 | Reiss | G02B 13/00 |
| | | | | | 359/785 |
| 3,640,606 | A | * | 2/1972 | Conrad | G02B 9/16 |
| | | | | | 359/789 |
| 3,762,801 | A | * | 10/1973 | Baker | G02B 13/18 |
| | | | | | 359/716 |
| 4,109,995 | A | * | 8/1978 | Betensky | G02B 9/16 |
| | | | | | 359/716 |
| 4,542,961 | A | * | 9/1985 | Sato | G02B 9/14 |
| | | | | | 359/708 |
| 5,134,522 | A | * | 7/1992 | Ueda | G02B 9/12 |
| | | | | | 359/648 |
| 5,596,455 | A | * | 1/1997 | Eckhardt | G02B 9/16 |
| | | | | | 359/785 |
| 5,600,488 | A | * | 2/1997 | Minefuji | G02B 13/16 |
| | | | | | 359/650 |
| 6,094,311 | A | * | 7/2000 | Moskovich | G02B 9/08 |
| | | | | | 359/740 |
| 6,124,978 | A | * | 9/2000 | Yoneyama | G02B 9/22 |
| | | | | | 359/680 |
| 6,144,499 | A | * | 11/2000 | Yokota | G02B 13/16 |
| | | | | | 359/714 |
| 6,791,629 | B2 | * | 9/2004 | Moskovich | H04N 9/28 |
| | | | | | 359/650 |
| 7,035,023 | B2 | * | 4/2006 | Nanba | G02B 9/16 |
| | | | | | 359/795 |
| 7,133,084 | B2 | * | 11/2006 | Moskovich | H04N 9/28 |
| | | | | | 359/650 |
| 9,042,026 | B2 | * | 5/2015 | Choi | G02B 27/0172 |
| | | | | | 359/651 |
| 10,031,317 | B2 | * | 7/2018 | Hsueh | G02B 13/0035 |
| 10,386,603 | B2 | * | 8/2019 | Hsueh | G02B 13/0035 |
| 11,137,573 | B2 | * | 10/2021 | Huang | G02B 13/16 |

FOREIGN PATENT DOCUMENTS

| | | | | |
|---|---|---|---|---|
| CN | 108279485 A | | 7/2018 | |
| JP | 01261614 A | * | 10/1989 | ............. G02B 13/18 |

* cited by examiner

PROJECTION LENS

CROSS-REFERENCE TO RELATED APPLICATIONS

The present disclosure claims priority to Chinese Patent Application. No. 201810195485.2, submitted to the China National Intellectual Property Administration (CHIPA) on Mar. 9, 2018, the contents of which are hereby incorporated by reference in its entirety.

TECHNICAL FIELD

The disclosure relates to a projection lens, and more particularly to a projection lens including three lenses.

BACKGROUND

In recent years, along with continuous improvement of sciences and technologies, interactive devices have gradually risen and projection lenses also have been applied more and more extensively. At present, chip technologies and intelligence algorithms are developed rapidly. An image is projected to a space object by use of an optical projection lens, an image signal is received, and then a three-dimensional image with position depth information of the object can be calculated. A specific method is as follows: light emitted by an infrared Laser Diode (LD) or a Vertical Cavity Surface Emitting Laser (VCSEL) is projected to a direction of a target object by use of the optical projection lens; after a projected beam passes through a Diffraction Optical Element (DOE), the projected image is redistributed on the target object; and the image projected onto the object is received by use of a camera lens, and then the three-dimensional image including the position depth information of the object which is projected may be calculated. The three-dimensional image with the depth information can further be configured for development of multiple deep applications such as biometric recognition.

A conventional projection lens for imaging eliminates various aberrations and improves a resolution in a manner of increasing the number of lenses, but this can also increase a Total Track Length (TTL) of the projection lens and is unfavorable for miniaturization of the lens. In addition, a conventional large-field-of-view projection lens is relatively great in distortion and poor in imaging quality and may not be matched with a Diffractive Optical Element (DOE) to accurately implement redistribution of a projected beam on a target object.

SUMMARY

According to an aspect, the disclosure provides a projection lens, which includes a first lens, a second lens and a third lens which are provided in sequence from an image source side to an imaging side along an optical axis, and the first lens has a positive refractive power, and a surface near the image source side of the first lens is a convex surface; the second lens has a positive refractive power or a negative refractive power; the third lens has a positive refractive power and is a meniscus lens of which a surface near the imaging side is a convex surface; and an image source height ImgH of the projection lens and a total effective focal length f of the projection lens meet ImgH/f<0.2.

In some embodiments, a radius of curvature R6 of the surface near the imaging side of the third lens and the total effective focal length f of the projection lens meet R6/f>−1.

In some embodiments, a radius of curvature R1 of the surface near the image source side of the first lens and a radius of curvature R6 of the surface near the imaging side of the third lens meet −1.2<R1/R6<−0.8.

In some embodiments, an effective focal length f3 of the third lens and the total effective focal length f of the projection lens meet 0<f3/f<1.

In some embodiments, a spacing distance T12 between the first lens and the second lens on the optical axis, a spacing distance T23 between the second lens and the third lens on the optical axis and a spacing distance Td between the surface near the image source side of the first lens and the surface near the imaging side of the third lens on the optical axis meet 0.3<(T12+T23)/Td<0.7.

In some embodiments, a radius of curvature R5 of a surface near the image source side of the third lens and the radius of curvature R6 of the surface near the imaging side of the third lens meet 0<|(R5−R6)/(R5+R6)|<1.

In some embodiments, a center thickness CT1 of the first lens on the optical axis and a sum ΣCT of the center thicknesses of the first lens on the optical axis, a center thicknesses of the second lens on the optical axis and a center thicknesses of the third lens on the optical axis meet 0.25<CT1/ΣCT<0.6.

In some embodiments, a SAG11 and a SAG32 meet −1.5<SAG11/SAG32<−0.5, the SAG11 is an on-axis distance from an intersection of the surface near the image source side of the first lens and the optical axis to a maximum effective semi-diameter vertex of the surface near the image source side of the first lens, the SAG32 is an from an on-axis distance from an intersection of the surface near the imaging side of the third lens and the optical axis to a maximum effective semi-diameter vertex of the surface near the imaging side of the third lens.

In some embodiments, a SAG11 and a SAG32 meet SAG31/SAG32<0.5, the SAG31 is an on-axis distance from an intersection of a surface near an image source side of the third lens and the optical axis to a maximum effective semi-diameter vertex of the surface near the imaging side of the third lens, the SAG32 is an on-axis distance from an intersection of the surface near the imaging side of the third lens and the optical axis to the maximum effective semi-diameter vertex of the surface near the imaging side of the third lens.

In some embodiments, a maximum effective semi-diameter DT11 of the surface near the image source side of the first lens and a maximum effective semi-diameter DT21 of a surface near the image source side of the second lens meet 1.2<DT11/DT21<2.

In some embodiments, an effective focal length f1 of the first lens, the effective focal length f3 of the third lens and the total effective focal length f of the projection lens meet 0.5<(f1+f3)/f<1.5.

In some embodiments, the on-axis distance SAG11 from the intersection of the surface near the image source side of the first lens and the optical axis to the maximum effective semi-diameter vertex of the surface near the image source side of the first lens, the maximum effective semi-diameter DT11 of the surface near the image source side of the first lens, the on-axis distance SAG32 from the intersection of the surface near the imaging side of the third lens and the optical axis to the maximum effective semi-diameter vertex of the surface near the imaging side of the third lens and a maximum effective semi-diameter DT32 of the surface near the imaging side of the third lens meet 0.5<|SAG11/DT11|/|SAG32/DT32|<1.5.

In some embodiments, an object space numerical aperture NA of the projection lens meet 0.18≤NA<0.3.

In some embodiments, a maximum incident angle CRAmax of a primary ray of the projection lens and a maximum half field of view HFOV of the projection lens meet tan (CRAmax)+tan(HFOV)<0.3.

In some embodiments, a minimum wavelength of a practically used wavelength A of the projection lens is 0 nm to 100 nm less than a minimum wavelength of a used light source, and a maximum wavelength of the practically used wavelength λ of the projection lens is 0 nm to 100 nm greater than a maximum wavelength of the used light source.

In some embodiments, a refractive index N2 of the second lens and a refractive index N3 of the third lens meet N2≤N3.

According to another aspect, the disclosure provides a projection lens, which includes a first lens, a second lens and a third lens which are provided in sequence from an image source side to an imaging side along an optical axis, and the first lens has a positive refractive power, and a surface near the image source side of the first lens is a convex surface; the second lens has a negative refractive power; the third lens has a positive refractive power and is a meniscus lens of which a surface near the imaging side is a convex surface; and a radius of curvature R1 of the surface near the image source side of the first lens and a radius of curvature R6 of the surface near the imaging side of the third lens meet −1.2<R1/R6<−0.8.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
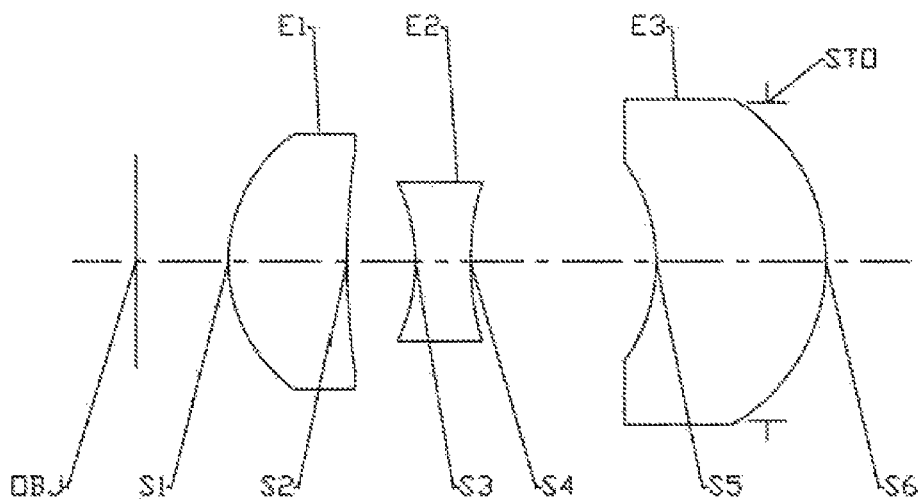
FIG. 1 is a structure diagram of a projection lens according to embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It is to be noted that, in the specification, expressions like first and second are adopted not to represent any limit to characteristics but only to distinguish one characteristic from another characteristic. Therefore, a first lens discussed below may also be called a second lens and the second lens may also be called the first lens under the condition of not departing from the teachings of the disclosure.

For convenient description, thicknesses, sizes and shapes of lenses are slightly magnified in the drawings. Specifically, spherical or aspheric shapes in the drawings are shown exemplarily. That is, spherical or aspheric shapes are not limited to the spherical or aspheric shapes shown in the drawings. The drawings are drawn only exemplarily but not strictly to scale.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, near an image source side, in each lens is called a surface near the image source side, and a surface, near an imaging side, in each lens is called a surface near the imaging side.

It is also to be understood that terms "include", "including", "have", "contain" and/or "containing", used in the specification, represent existence of a stated characteristic, component and/or part but do not exclude existence or addition of one or more other characteristics, components and parts and/or combinations thereof. In addition, expressions like "at least one in." may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments can be combined without conflicts. The disclosure will be described below with reference to the drawings and in combination with the embodiments in detail.

The characteristics, principles and other aspects of the disclosure will be described below in detail.

Projection lenses according to some embodiments of the disclosure can include, for example, three lenses with refractive powers, i.e., a first lens, a second lens and a third lens. The three lenses are sequentially arranged from an image source side to an imaging side along an optical axis.

In some embodiments, the first lens has a positive refractive power, and a surface near the image source side thereof is a convex surface; the second lens has a positive refractive power or a negative refractive power; and the third lens has a positive refractive power and is a meniscus lens of which a surface near the imaging side is a convex surface. The surface near the image source side of the first lens with the positive refractive power is a convex surface, which is favorable for achieving telecentricity of the image source side of a system, improving the telecentricity of the system, increasing inlet light of an off-axis field of view of the system and improving brightness and uniformity of a projection picture. The surface near the imaging side of the third lens with the positive refractive power is a convex surface, which is favorable for reducing a spherical aberration of the system and improving imaging quality.

In some embodiments, the second lens has a negative refractive power.

In some embodiments, a surface near the image source side of the third lens is a concave surface.

In some embodiments, the projection lens of the disclosure meet a conditional expression R6/f>−1, and R6 is a radius of curvature of the surface near the imaging side of the third lens, and f is a total effective focal length of the projection lens. More specifically, R6 and f further meet −0.3<R6/f<−0.1, for example, −0.27≤R6/f≤−0.19. Meeting the conditional expression R6/f>−1 is favorable for reducing a TTL of the lens and implementing module miniaturization.

In some embodiments, the projection lens of the disclosure meets a conditional expression 0.18≤NA<0.3, and NA is an object space numerical aperture of the projection lens. More specifically, NA further meets 0.18≤NA≤0.22. Meeting the conditional expression 0.18≤NA<0.3 is favorable for achieving a relatively large numerical aperture of the optical projection system, improving a light source receiving capability of the lens and improving projection energy efficiency, thereby obtaining a brighter projected image.

In some embodiments, the projection lens of the disclosure meets a conditional expression 0≤f3/f<1, and f3 is an effective focal length of the third lens, and f is the total effective focal length of the projection lens. More specifically, f3 and f further meets 0.3<f3/f<0.8, for example, 0.37≤f3/f≤0.72. Meeting the conditional expression 0<f3/f<1 is favorable for reducing the TTL of the lens and implementing module miniaturization and is also favorable for achieving high projection imaging quality of the projection lens.

In some embodiments, the projection lens of the disclosure meets a conditional expression ImgH/f<0.2, and ImgH is an image source height of the projection lens, and f is the total effective focal length of the projection lens. More specifically, ImgH and f further meets 0.10<ImgH/f<0.15, for example, 0.11≤ImgH/f≤0.14. Meeting the conditional expression ImgH/f<0.2 is favorable for improving the uniformity of the projection picture, improving a matching degree of the field of view of the projection lens and a DOE and improving the projection quality.

In some embodiments, the projection lens of the disclosure meets a conditional expression tan(CRAmax)+tan(HFOV)<0.3, and CRAmax is a maximum incident angle of a primary ray of the projection lens, and HFOV is a maximum half field of view of the projection lens. More specifically, CRAmax and HFOV further meets 0.10<tan(CRAmax)+tan(HFOV)<0.15, for example, 0.11≤tan(CRAmax)+tan(HFOV)≤0.14. Meeting the conditional expression tan(CRAmax)+tan(HFOV)<0.3 is favorable for balancing and improving the telecentricity of the system and the uniformity of the projection picture and is also favorable for improving the matching degree of the field of view of the projection lens and the DOE.

In some embodiments, the projection lens of the disclosure meets a conditional expression 0.3<(T12+T23)/Td<0.7, and T12 is a spacing distance between the first lens and the second lens on the optical axis, T23 is a spacing distance between the second lens and the third lens on the optical axis, and Td is a spacing distance between the surface near the image source side of the first lens and the surface near the imaging side of the third lens on the optical axis. More specifically, T12, T23 and Td further meets 0.3<(T12+T23)/Td≤0.50, for example, 0.38≤(T12+T23)/Td≤0.50. Meeting the conditional expression 0.3<(T12+T23)/Td<0.7 is favorable for reasonably allocating spacings of the lenses, regulating ray distribution and reducing tolerance sensitivity of a thickness of each lens in the system and favorable for improving the yield.

In some embodiments, the projection lens of the disclosure meets a conditional expression 0<|(R5−R6)/(R5+R6)|<1, and R5 is a radius of curvature of a surface near the image source side of the third lens, and R6 is a radius of curvature of the surface near the imaging side of the third lens. More specifically, R5 and R6 further meets 0.11|(R5−R6)/(R5+R6)|≤0.89. Meeting the conditional expression 0<|(R5−R6)/(R5+R6)|<1 is favorable for reducing the TTL of the lens and implementing module miniaturization and is also favorable for improving the telecentricity of the system, increasing the inlet light of the off-axis field of view of the system and improving the imaging quality.

In some embodiments, the projection lens of the disclosure meets a conditional expression 0.25<CT1/ΣCT<0.6, and CT1 is a center thickness of the first lens on the optical axis, and ΣCT is a sum of a center thicknesses of the first lens on the optical axis, a center thicknesses of the second lens on the optical axis and a center thicknesses of the third lens on the optical axis. More specifically, CT1 and ΣCT further meet 0.31≤CT1/ΣCT≤0.51. Meeting the conditional expression 0.25<CT1/ΣCT<0.6 is favorable for reasonably allocating a lens space, favorable for regulating the ray distribution and reducing the tolerance sensitivity of the system and favorable for assembling the lenses to improve the yield.

In some embodiments, the projection lens of the disclosure meets a conditional expression SAG31/SAG32<0.5, where SAG31 is an on-axis distance from an intersection of the surface near the image source side of the third lens and the optical axis to a maximum effective semi-diameter vertex of the surface near the image source side of the third lens, and SAG32 is an on-axis distance from an intersection of the surface near the imaging side of the third lens and the optical axis to the maximum effective semi-diameter vertex of the surface near the imaging side of the third lens. More specifically, SAG31 and SAG32 further meet 0.06≤SAG31/SAG32≤0.45. Meeting the conditional expression SAG31/SAG32<0.5 is favorable for distributing the refractive power of the system, reducing the tolerance sensitivity of the system and improving the manufacturability of the individual lenses.

In some embodiments, the projection lens of the disclosure meets a conditional expression 1.2<DT11/DT21<2, and DT11 is a maximum effective semi-diameter of the surface near the image source side of the first lens, and DT21 is a maximum effective semi-diameter of a surface near the image source side of the second lens. More specifically, DT11 and DT21 further meet 1.4<DT11/DT21<2.0, for example, 1.46≤DT11/DT21≤1.94. Meeting the conditional expression 1.2<DT11/DT21<2 is favorable for balancing module miniaturization, the manufacturability of the first lens and the second lens and the system sensitivity.

A wavelength range of a practically used wavelength λ of the projection lens of the disclosure floats by ±100 nm based on a wavelength range of a used light source. Specifically, a minimum wavelength of the practically used wavelength λ of the projection lens is about 0 nm to 100 nm less than a minimum wavelength of the used light source, and a maximum wavelength of the practically used wavelength λ is about 0 nm to 100 nm greater than a maximum wavelength of the used light source. The projection lens of the disclosure is applied to any monochromatic source band. For example, the projection lens of the disclosure is applied to an infrared single-wavelength band. Using a monochromatic source is favorable for reducing a chromatic aberration, stray light and the like brought by a wide wavelength range and favorable for improving the imaging quality of the projection lens, and meanwhile, ensures that the projection lens meets a requirement on matching with a light interface of the DOE.

In some embodiments, the projection lens of the disclosure meets a conditional expression 0.5<(f1+f3)/f<1.5, and f1 is an effective focal length of the first lens, f3 is the effective focal length of the third lens, and f is the total effective focal length of the projection lens. More specifically, f1, f3 and f further meet 0.7<(f1+f3)/f<1.4, for example, 0.75≤(f1+f3)/f≤1.38. The refractive power of the first lens and the third lens is reasonably configured, so that the aberration of the system is corrected, and optical performance of the system is improved.

In some embodiments, the projection lens of the disclosure meets a conditional expression 0.5<|SAG11/DT11|/|SAG32/DT32|<1.5, and SAG11 is the on-axis distance from the intersection of the surface near the image source side of the first lens and the optical axis to the maximum effective semi-diameter vertex of the surface near the image source side of the first lens, DT11 is the maximum effective semi-diameter of the surface near the image source side of the first lens, SAG32 is the on-axis distance from the intersection of the surface near the imaging side of the third lens and the optical axis to the maximum effective semi-diameter vertex of the surface near the imaging side of the third lens, and DT32 is a maximum effective semi-diameter of the surface near the imaging side of the third lens. More specifically, SAG11, DT11, SAG32 and DT32 further meet 0.79≤|SAG11/DT11|/|SAG32/DT32|≤1.45. Meeting the conditional expression 0.5<|SAG11/DT11|/|SAG32/DT32|<1.5 is favorable for balancing improvement in the telecentricity of the system and correction of the spherical aberration and coma of the system relatively well and improving the projection imaging quality.

In some embodiments, the projection lens of the disclosure meets a conditional expression −1.2<R1/R6<−0.8, and R1 is a radius of curvature of the surface near the image source side of the first lens, and R6 is the radius of curvature of the surface near the imaging side of the third lens. More specifically, R1 and R6 further meet −1.06≤R1/R6≤−0.81. Meeting the conditional expression −1.2<R1/R6<−0.8 is favorable for reducing a distortion and aberration of the projection lens and improving the optical performance of the lens.

In some embodiments, the projection lens of the disclosure meets a conditional expression −1.5<SAG11/SAG32<−0.5, and SAG11 is the on-axis distance from the intersection of the surface near the image source side of the first lens and the optical axis to the maximum effective semi-diameter vertex of the surface near the image source side of the first lens, and SAG32 is the on-axis distance from the intersection of the surface near the imaging side of the third lens and the optical axis to the maximum effective semi-diameter vertex of the surface near the imaging side of the third lens. More specifically, SAG11 and SAG32 further meet −1.38≤SAG11/SAG32≤−0.53. Meeting the conditional expression −1.5<SAG11/SAG32<−0.5 is favorable for reducing the tolerance sensitivity of the system and improving the manufacturability of the lenses.

In some embodiments, the projection lens of the disclosure meets a conditional expression N2≤N3, and N2 is a refractive index of the second lens, and N3 is a refractive index of the third lens. Meeting the conditional expression N2≤N3 is favorable for improving the optical performance of the projection lens.

In some embodiments, the optical projection system further includes at least one diaphragm to improve the imaging quality of the lens. Optionally, the diaphragm is arranged between the third lens and the imaging side.

The optical projection system of the disclosure is applied to the field of depth detection as a speckle projection lens. When the optical projection system of the disclosure is used for depth detection over a target object in a space, light emitted by an infrared LD or a VCSEL passes through the optical projection system for spot magnification at first, then passes through the DOE and is projected to a direction of the target object. After a projected beam passes through the DOE, a projected image is redistributed on the target object. Image information projected onto the target object is subsequently captured through any well-known camera lens, and then a three-dimensional image with position depth information of the target object is calculated. The optical projection system according to the disclosure can be matched with the DOE for use, thereby accurately implementing redistribution of the projected beam on the target object.

In some embodiments of the disclosure, most of the lenses adopt an aspheric mirror surface. The aspheric mirror surface has the characteristic that the curvature keeps changing from a center of the lens to a periphery of the lens. Unlike a spherical lens with a constant curvature from a center of the lens to a periphery of the lens, an aspheric lens has a better radius of curvature characteristic and the advantages of improving and improving distortion aberrations and astigmatic aberrations. With adoption of the aspheric lens, the aberrations during imaging may be eliminated as much as possible, thereby improving the imaging quality.

However, those skilled in the art should know that the number of the lenses forming the projection lens may be changed without departing from the technical solutions claimed in the disclosure to achieve each result and advantage described in the specification. For example, although descriptions are made in the implementation with three lenses as an example, the projection lens is not limited to three lenses. If necessary, the projection lens may further include another number of lenses.

Specific embodiments of the projection lens applied to the abovementioned implementation mode will further be described below with reference to the drawings.

Embodiment 1

A projection lens according to embodiment 1 of the disclosure will be described below with reference to FIG. 1 to FIG. 2B. FIG. 1 is a structure diagram of a projection lens according to embodiment 1 of the disclosure.

As shown in FIG. 1, the projection lens according to the exemplary implementation mode of the disclosure includes a first lens E1, a second lens E2, a third lens E3 and a diaphragm STO which are provided in sequence from the image source side to the imaging side along the optical axis.

The first lens E1 has a positive refractive power, a surface near the image source side S1 of the first lens is a convex surface, and a surface near the imaging side S2 is a concave surface. The second lens E2 has a negative refractive power, a surface near the image source side S3 of second lens is a concave surface, and a surface near the imaging side S4 is a concave surface. The third lens E3 has a positive refractive power, a surface near the image source side S5 of the third lens is a concave surface, and a surface near the imaging side S6 is a convex surface. Light from the image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 1 shows the surface type, the radius of curvature, the thickness, the material and conic coefficient of each lens of the projection lens according to embodiment 1. Units of the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | 0.4700 | | | |
| S1 | Aspheric | 1.0105 | 0.5953 | 1.63 | 20.4 | 0.9855 |
| S2 | Aspheric | 4,363.9700 | 0.3477 | | | 0.0002 |
| S3 | Aspheric | −1.7469 | 0.2800 | 1.63 | 20.4 | 16.4036 |
| S4 | Aspheric | 1.0478 | 0.9440 | | | −5.2860 |
| S5 | Aspheric | −1.2566 | 0.8630 | 1.79 | 41.0 | 4.4258 |
| S6 | Aspheric | −1.0098 | −0.3000 | | | −0.2560 |
| STO | Spherical | Infinite | 700.0000 | | | |
| IMA | Spherical | Infinite | | | | |

From Table 1, it can be seen that both the surface near the image source side and surface near the imaging side of any lens in the first lens E1 to the third lens E3 are aspheric surfaces. In the embodiment, the surface type x of each aspheric lens may be defined by use of, but not limited to, the following aspheric surface formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at a height h from the optical axis; c is a paraxial curvature of the aspheric surface, c=1/R (namely, the paraxial curvature c is a reciprocal of the radius of curvature R in Table 1); k is the conic coefficient (given in Table 1); and Ai is the correction coefficient of the $i^{th}$ order of aspheric surface. Table 2 shows high-order coefficients $A_4$, $A_6$, $A_{10}$, $A_{11}$, $A_{12}$, $A_{14}$ and $A_{16}$ applied to the aspheric mirror surfaces S1-S6 in embodiment 1.

TABLE 2

| Surface number | A4 | A6 | A8 | A10 | A12 | A14 | A16 |
|---|---|---|---|---|---|---|---|
| S1 | 6.2280E−01 | −1.4867E+00 | 5.7317E−02 | 3.5337E+01 | −1.8667E+02 | 4.0521E+02 | −3.4711E+02 |
| S2 | 9.1582E−01 | −8.9518E−01 | 1.6452E+00 | 7.0438E+01 | −6.6759E+02 | 1.6088E+03 | −1.0509E+03 |
| S3 | 1.5029E−01 | −1.9782E+01 | 5.2207E+02 | −9.2104E+03 | 8.9922E+04 | −4.6545E+05 | 9.9017E+05 |
| S4 | 9.9159E−02 | 1.1029E+00 | −1.1641E+02 | 1.6263E+03 | −1.2207E+04 | 4.5279E+04 | −6.0913E+04 |

TABLE 2-continued

| Surface number | A4 | A6 | A8 | A10 | A12 | A14 | A16 |
|---|---|---|---|---|---|---|---|
| S5 | −3.4852E−02 | 9.2948E−02 | −4.6911E+00 | 5.4220E+01 | −3.1907E+02 | 9.2835E+02 | −1.1017E+03 |
| S6 | −4.8065E−02 | 1.2099E−02 | −5.2577E−01 | 1.9824E+00 | −4.6553E+00 | 5.4550E+00 | −2.7607E+00 |

Table 3 shows a total effective focal length f of the projection lens in embodiment 1, an effective focal lengths f1 to f3 of the lenses, a maximum half field of view HFOV of the projection lens and an object space numerical aperture NA of the projection lens.

TABLE 3

| Parameter | f(mm) | f1(mm) | f2(mm) | f3(mm) | HFOV(°) | NA |
|---|---|---|---|---|---|---|
| Numerical value | 4.50 | 1.60 | −1.00 | 2.56 | 6.9 | 0.18 |

The projection lens in embodiment 1 meets:

R6/f=−0.22, where R6 is a radius of curvature of the surface near the imaging side S6 of the third lens E3, and f is the total effective focal length of the projection lens;

f3/f=0.57, where f3 is an effective focal length of the third lens E3, and f is the total effective focal length of the projection lens;

ImgH/f=0.12, and ImgH is an image source height of the projection lens, and f is the total effective focal length of the projection lens;

tan(CRAmax)+tan(HFOV)=0.12, and CRAmax is a maximum incident angle of a primary ray, and HFOV is a maximum half field of view of the projection lens;

(T12+T23)/Td=0.43, and T12 is a spacing distance between the first lens E1 and the second lens E2 on the optical axis, T23 is a spacing distance between the second lens E2 and the third lens E3 on the optical axis, and Td is a spacing distance between the surface near the image source side S1 of the first lens E1 and the surface near the imaging side S6 of the third lens E3 on the optical axis;

|(R5−R6)/(R5+R6)|=0.11, and R5 is a radius of curvature of the surface near the image source side S5 of the third lens E3, and R6 is a radius of curvature of the surface near the imaging side S6 of the third lens E3;

CT1/ΣCT=0.34, and CT1 is a center thickness of the first lens E1 on the optical axis, and ΣCT is a sum of the center thicknesses of the first lens E1 on the optical axis, a center thickness of the first lens E2 on the optical axis, and a center thickness of the third lens E3 on the optical axis;

SAG31/SAG32=0.35, and SAG31 is an on-axis distance from an intersection of the surface near the image source side S5 of the third lens E3 and the optical axis to a maximum effective semi-diameter vertex of the surface near the image source side S5 of the third lens E3, and SAG32 is an on-axis distance from the intersection of the surface near the imaging side S6 of the third lens E3 and the optical axis to a maximum effective semi-diameter vertex of the surface near the imaging side S6 of the third lens E3;

DT11/DT21=1.62, and DT11 is a maximum effective semi-diameter of the surface near the image source side S1 of the first lens E1, and DT21 is a maximum effective semi-diameter of the surface near the image source side S3 of the second lens E2;

(f1+f3)/f=0.92, and f1 is the effective focal length of the first lens E1, f3 is the effective focal length of the third lens E3, and f is the total effective focal length of the projection lens;

|SAG11/DT11|/|SAG32/DT32|=0.90, and SAG11 is an on-axis distance from the intersection of the surface near the image source side S1 of the first lens E1 and the optical axis to the maximum effective semi-diameter vertex of the surface near the image source side S1 of the first lens E1, DT11 is the maximum effective semi-diameter of the surface near the image source side S1 of the first lens E1, SAG32 is the on-axis distance from the intersection of the surface near the imaging side S6 of the third lens E3 and the optical axis to the maximum effective semi-diameter vertex of the surface near the imaging side S6 of the third lens E3, and DT32 is a maximum effective semi-diameter of the surface near the imaging side S6 of the third lens E3;

R1/R6=−1.00, where R1 is a radius of curvature R1 of the surface near the image source side S1 of the first lens E1, and R6 is the radius of curvature R6 of the surface near the imaging side S6 of the third lens E3; and SAG11/SAG32=−0.71, wherein SAG11 is the on-axis distance from the intersection of the surface near the image source side S1 of the first lens E1 and the optical axis to the maximum effective semi-diameter vertex of the surface near the image source side S1 of the first lens E1, and SAG32 is the on-axis distance from the intersection of the surface near the imaging side S6 of the third lens E3 and the optical axis to the maximum effective semi-diameter vertex of the surface near the imaging side S6 of the third lens E3.

Figure 2A:
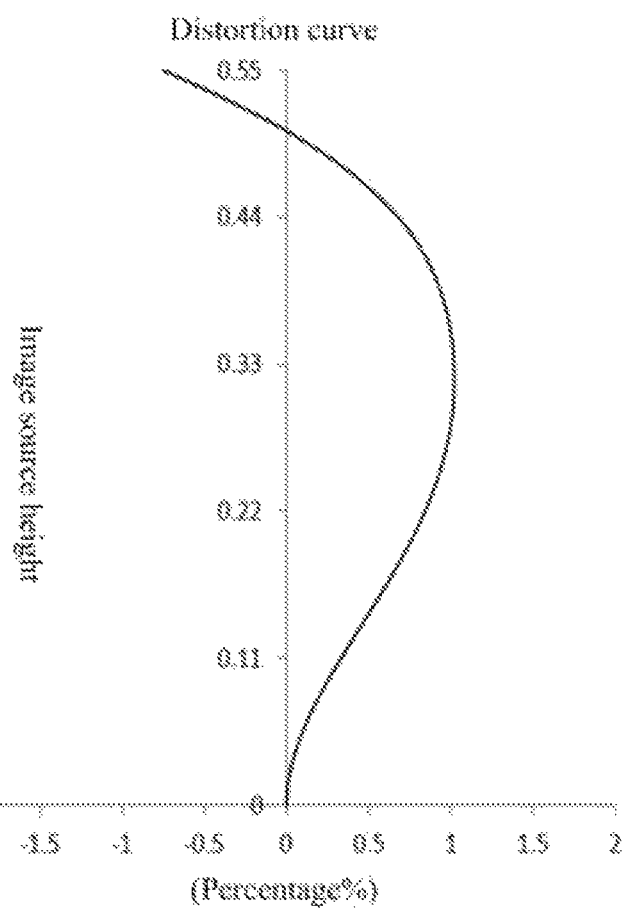
FIG. 2A to FIG. 2B illustrate a distortion curve and relative illumination curve of the projection lens according to embodiment 1 respectively.
Figure 2B:
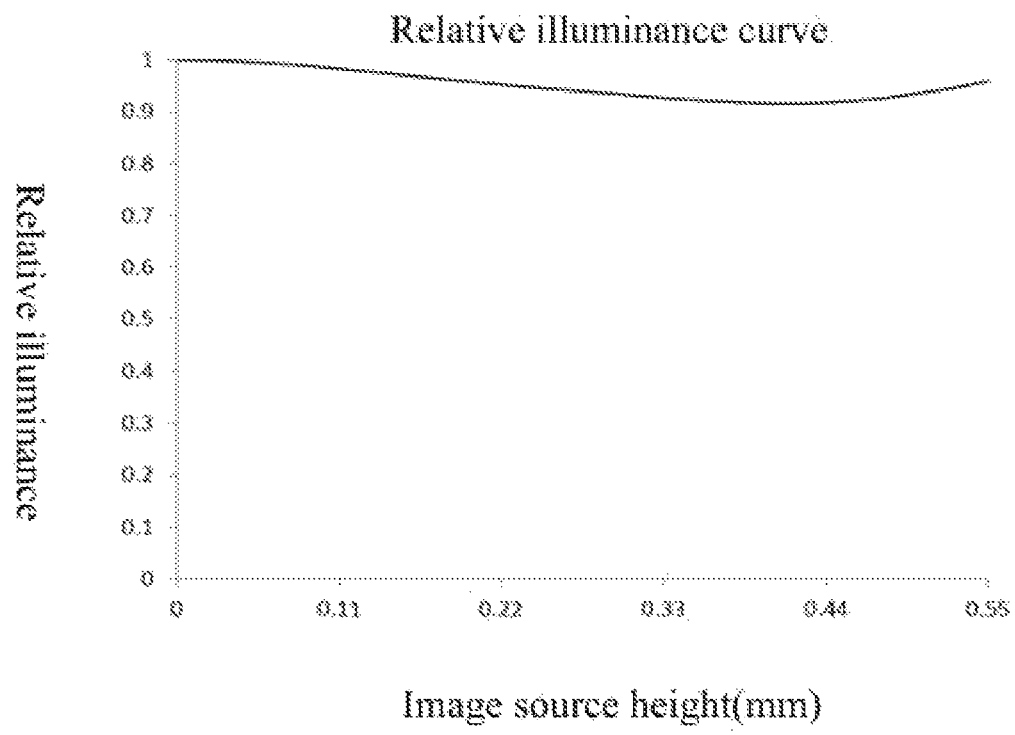

FIG. 2A illustrates a distortion curve of the projection lens according to embodiment 1 to represent a distortion value under different viewing angles. FIG. 2B illustrates a relative illumination curve of the projection lens according to embodiment 1 to represent relative illuminance corresponding to different image heights on an imaging surface. According to FIG. 2A and FIG. 2B, it can be seen that the projection lens provided in embodiment 1 achieves high imaging quality.

Embodiment 2

Figure 3:
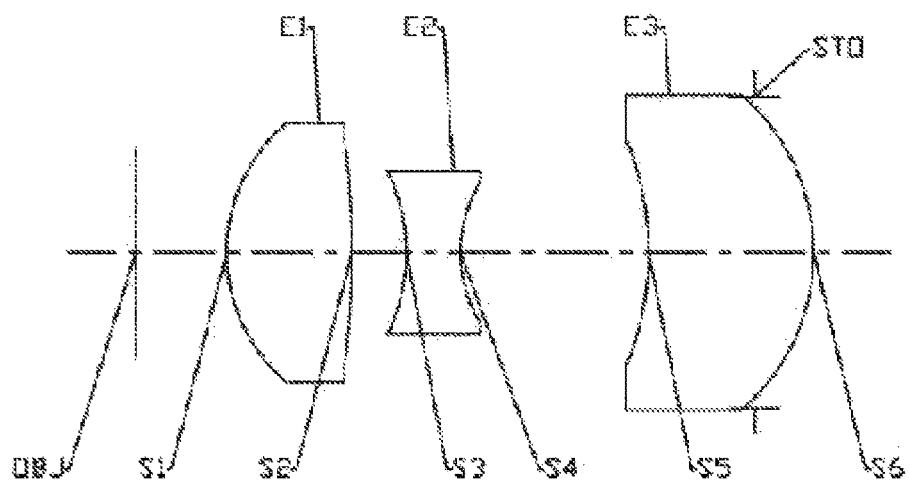
FIG. 3 is a structure diagram of a projection lens according to embodiment 2 of the disclosure.

A projection lens according to embodiment 3 of the disclosure will be described below with reference to FIG. 3 to FIG. 4B. In the embodiment and the following embodiments, part of descriptions similar to those about embodiment are omitted for simplicity. FIG. 3 is a structure diagram of a projection lens according to embodiment 2 of the disclosure.

As shown in FIG. 3, the projection lens according to the exemplary implementation mode of the disclosure includes a first lens E1, a second lens E2, a third lens E3 and a diaphragm STO which are provided in sequence from an image source side to an imaging side along an optical axis.

The first lens E1 has a positive refractive power, a surface near the image source side S1 of the first lens is a convex surface, and a surface near the imaging side S2 is a convex surface. The second lens E2 has a negative refractive power, a surface near the image source side S3 of the second lens is a concave surface, and a surface near the imaging side S4 is a concave surface. The third lens E3 has a positive refractive power, a surface near the image source side S5 of the third lens is a concave surface, and a surface near the imaging side S6 is a convex surface. Light from the image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 4 shows the surface type, the radius of curvature, the thickness, the material and conic coefficient of each lens of the projection lens according to embodiment 1. Units of the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | Spherical | Infinite | 0.4700 | | | |
| S1 | Aspheric | 0.8989 | 0.6477 | 1.63 | 20.4 | −0.5046 |
| S2 | Aspheric | −9.3343 | 0.2812 | | | 0.0000 |
| S3 | Aspheric | −1.2916 | 0.2800 | 1.63 | 20.4 | 1.9769 |
| S4 | Aspheric | 0.7953 | 0.9712 | | | −2.1392 |
| S5 | Aspheric | −1.8045 | 0.8499 | 1.79 | 41.0 | −0.0366 |
| S6 | Aspheric | −1.0985 | −0.3000 | | | −0.4217 |
| STO | Spherical | Infinite | 700.0000 | | | |
| IMA | Spherical | Infinite | | | | |

From Table 4, it can be seen that, in embodiment 2, both the surface near the image source side and surface near the imaging side of any lens in the first lens E1 to the third lens E3 are aspheric surfaces. Table 5 shows higher-order coefficients applied to each aspheric mirror surface in embodiment 2. The surface type of each aspheric surface may be defined by formula (1) given in embodiment 1.

TABLE 5

| Surface number | A4 | A6 | A8 | A10 | A12 | A14 | A16 |
|---|---|---|---|---|---|---|---|
| S1 | 4.9858E−01 | −2.9917E+00 | 1.6295E+01 | −4.8718E+01 | 7.3856E+01 | −5.3254E+01 | 1.4479E+01 |
| S2 | 2.7309E−01 | −6.0898E+00 | 6.5975E+01 | −4.4049E+02 | 1.5712E+03 | −2.8271E+03 | 2.0424E+03 |
| S3 | −1.7925E−01 | −1.5357E+01 | 3.3439E+02 | −4.7448E+03 | 3.6273E+04 | −1.3831E+05 | 2.1088E+05 |
| S4 | 9.5422E−01 | 5.5391E+00 | −1.6355E+02 | 2.6519E+03 | −2.4603E+04 | 1.2868E+05 | −2.8207E+05 |
| S5 | −9.1875E−02 | 3.9229E−01 | −7.5500E+00 | 5.5949E+01 | −2.2210E+02 | 4.4207E+02 | −3.5149E+02 |
| S6 | −3.5125E−02 | 2.1562E−03 | −2.2127E−01 | 7.1048E−01 | −1.3457E+00 | 1.2428E+00 | −4.8025E−01 |

Table 6 shows a total effective focal length f of the projection lens in embodiment 2, effective focal lengths f1 to f3 of the lenses, a maximum half field of view HFOV of the projection lens and an object space numerical aperture NA of the projection lens.

TABLE 6

| Parameter | f(mm) | f1(mm) | f2(mm) | f3(mm) | HFOV(°) | NA |
|---|---|---|---|---|---|---|
| Numerical value | 4.50 | 1.33 | −0.74 | 2.32 | 7.0 | 0.18 |

Figure 4A:
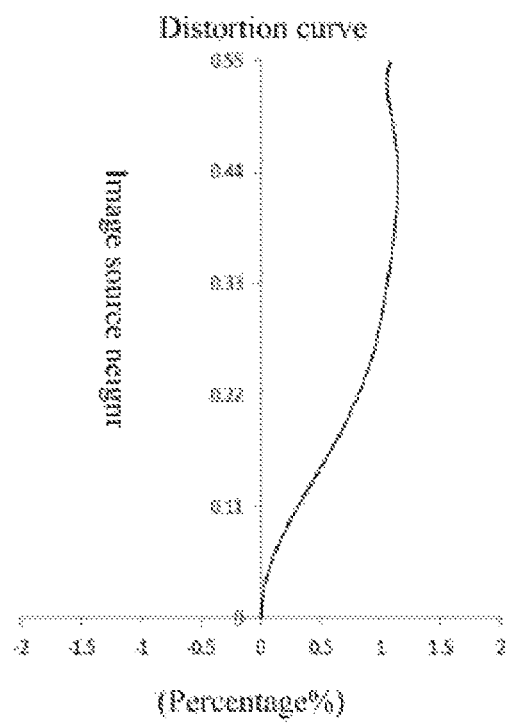
FIG. 4A to FIG. 4B illustrate a distortion curve and relative illumination curve of the projection lens according to embodiment 2 respectively.
Figure 4B:
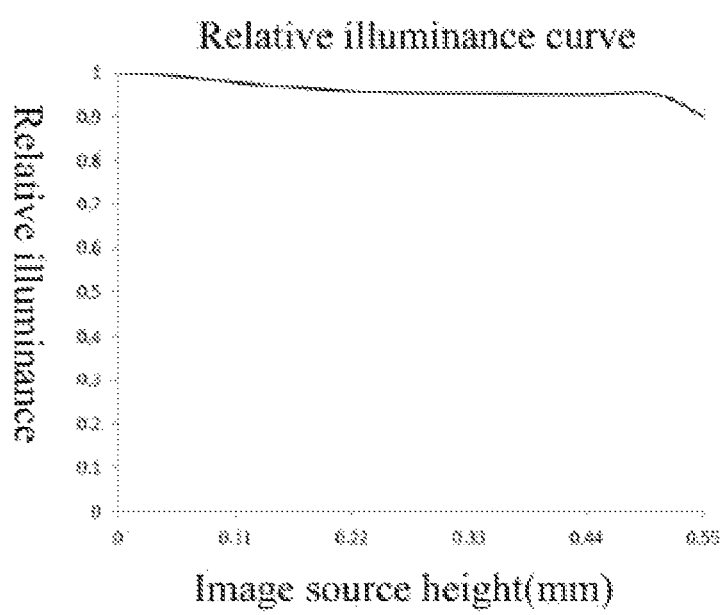

FIG. 4A illustrates a distortion curve of the projection lens according to embodiment 2 to represent a distortion value under different viewing angles. FIG. 4B illustrates a relative illumination curve of the projection lens according to embodiment 2 to represent relative illuminance corresponding to different image heights on an imaging surface. According to FIG. 4A and FIG. 4B, it can be seen that the projection lens provided in embodiment 2 achieves high imaging quality.

Embodiment 3

Figure 5:
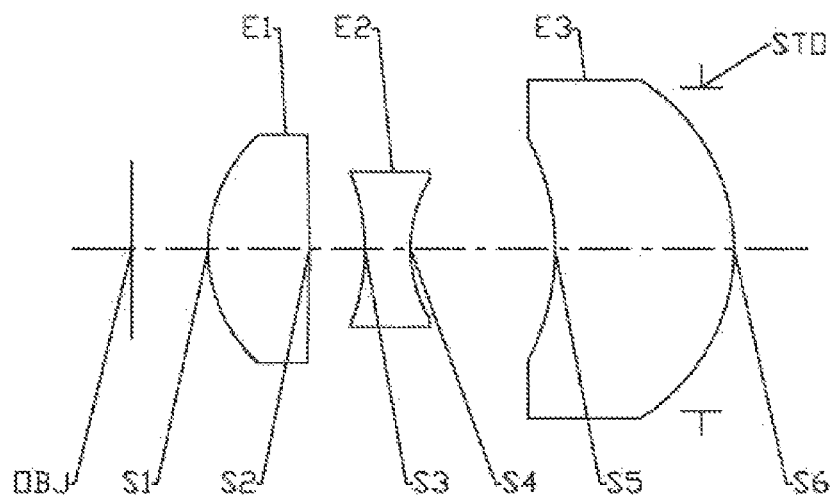
FIG. 5 is a structure diagram of a projection lens according to embodiment 3 of the disclosure.

A projection lens according to embodiment 5 of the disclosure will be described below with reference to FIG. 5 to FIG. 6B. FIG. 5 is a structure diagram of a projection lens according to embodiment 3 of the disclosure.

As shown in FIG. 5, the projection lens according to the exemplary implementation mode of the disclosure includes a first lens E1, a second lens E2, a third lens E3 and a diaphragm STO which are provided in sequence from an image source side to an imaging side along an optical axis.

The first lens E1 has a positive refractive power, a surface near the image source side S1 thereof is a convex surface, and a surface near the imaging side S2 is a convex surface. The second lens E2 has a negative refractive power, a surface near the image source side S3 thereof is a concave surface, and a surface near the imaging side S4 is a concave surface. The third lens E3 has a positive refractive power, a surface near the image source side S5 thereof is a concave surface, and a surface near the imaging side S6 is a convex surface. Light from an image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 7 shows a surface type, radius of curvature, thickness, material and conic coefficient of each lens of the projection lens according to embodiment 3. Units of the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | Spherical | Infinite | 0.4700 | | | |
| S1 | Aspheric | 1.0933 | 0.6217 | 1.63 | 20.4 | 0.0000 |
| S2 | Aspheric | −3.8958 | 0.3413 | | | −0.0220 |
| S3 | Aspheric | −1.0038 | 0.2800 | 1.63 | 20.4 | −4.3304 |
| S4 | Aspheric | 1.4374 | 0.8878 | | | 0.0000 |
| S5 | Aspheric | −1.7029 | 1.0992 | 1.79 | 41.0 | 1.0143 |
| S6 | Aspheric | −1.1984 | −0.2000 | | | −0.5063 |
| STO | Spherical | Infinite | 700.0000 | | | |
| IMA | Spherical | Infinite | | | | |

From Table 7, it can be seen that, in embodiment 3, both the surface near the image source side and surface near the imaging side of any lens in the first lens E1 to the third lens E3 are aspheric surfaces. Table 8 shows higher-order coefficients applied to each aspheric mirror surface in embodiment 3. The surface type of each aspheric surface may be defined by formula (1) given in embodiment 1.

TABLE 8

| Surface number | A4 | A6 | A8 | A10 | A12 | A14 | A16 |
|---|---|---|---|---|---|---|---|
| S1 | 4.3734E−01 | −1.7212E+00 | 9.6981E+00 | −3.3003E+01 | 5.9778E+01 | −5.1630E+01 | 1.5061E+01 |
| S2 | 4.7602E−01 | −1.9450E+00 | 2.1787E+01 | −1.4074E+02 | 4.5495E+02 | −7.4730E+02 | 5.0504E+02 |
| S3 | 1.1546E+00 | −7.6304E+00 | 4.3724E+01 | −4.6064E+02 | 3.0014E+03 | −1.0016E+04 | 1.3697E+04 |
| S4 | 1.8920E+00 | 3.5190E−01 | −5.9719E+01 | 5.1582E+02 | −2.0309E+03 | 3.8356E+03 | −2.8007E+03 |
| S5 | −3.5628E−02 | 2.5174E−01 | −3.5535E+00 | 2.0147E+01 | −6.1586E+01 | 9.4448E+01 | −5.8285E+01 |
| S6 | −2.8717E−02 | −7.5826E−03 | −4.5109E−02 | 8.7442E−02 | −1.2221E−01 | 8.2861E−02 | −2.6448E−02 |

Table 9 shows a total effective focal length f of the projection lens in embodiment 3, effective focal lengths f1 to f3 of the lenses, a maximum half field of view HFOV of the projection lens and an object space numerical aperture NA of the projection lens.

TABLE 9

| Parameter | f(mm) | f1(mm) | f2(mm) | f3(mm) | HFOV(°) | NA |
|---|---|---|---|---|---|---|
| Numerical value | 4.50 | 1.42 | −0.89 | 2.61 | 7.0 | 0.22 |

Figure 6A:
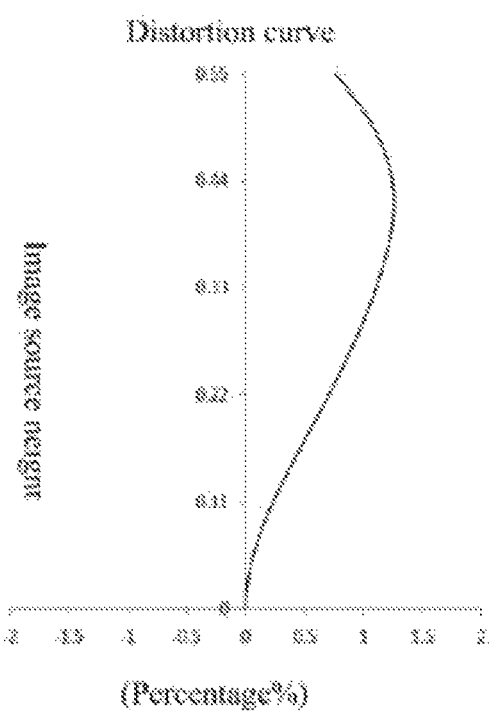
FIG. 6A to FIG. 6B illustrate a distortion curve and relative illumination curve of the projection lens according to embodiment 3 respectively.
Figure 6B:
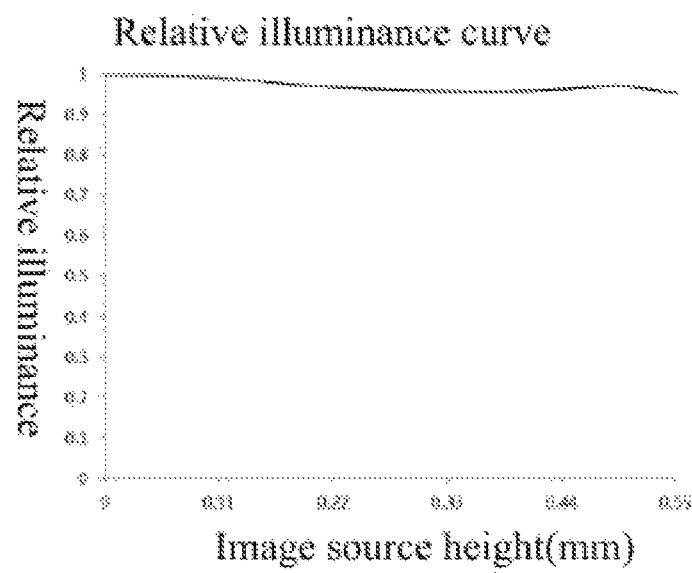

FIG. 6A illustrates a distortion curve of the projection lens according to embodiment 3 to represent a distortion value under different viewing angles. FIG. 6B illustrates a relative illumination curve of the projection lens according to embodiment 3 to represent relative illuminance corresponding to different image heights on an imaging surface. According to FIG. 6A and FIG. 6B, it can be seen that the projection lens provided in embodiment 3 achieves high imaging quality.

Embodiment 4

Figure 7:
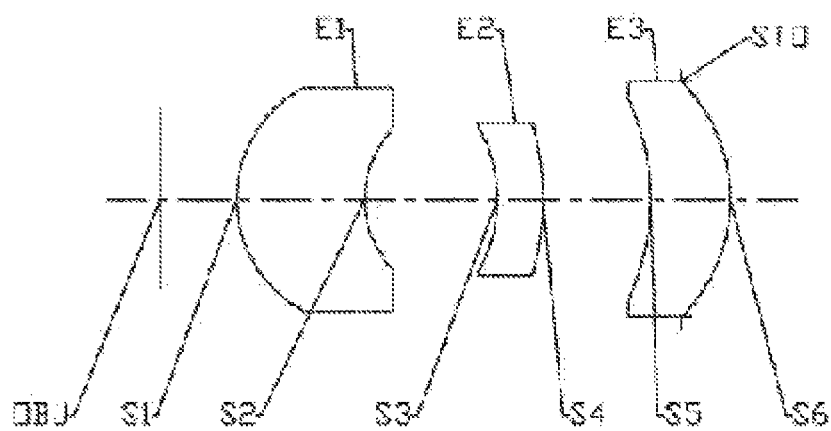
FIG. 7 is a structure diagram of a projection lens according to embodiment 4 of the disclosure.

A projection lens according to embodiment 7 of the disclosure will be described below with reference to FIG. 7 to FIG. 8B. FIG. 7 is a structure diagram of a projection lens according to embodiment 4 of the disclosure.

As shown in FIG. 7, the projection lens according to the exemplary implementation mode of the disclosure includes a first lens E1, a second lens E2, a third lens E3 and a diaphragm STO which are provided in sequence from an image source side to an imaging side along an optical axis.

The first lens E1 has a positive refractive power, a surface near the image source side S1 thereof is a convex surface, a surface near the imaging side S2 is a concave surface, and both the surface near the image source side S1 and surface near the imaging side S2 of the first lens E1 are aspheric surfaces.

The second lens E2 has a negative refractive power, a surface near the image source side S3 thereof is a concave surface, a surface near the imaging side S4 is a convex surface, and both the surface near the image source side S3 and surface near the imaging side S4 of the second lens E2 are aspheric surfaces.

The third lens E3 has a positive refractive power, a surface near the image source side S5 thereof is a concave surface, a surface near the imaging side S6 is a convex surface, and both the surface near the image source side S5 and surface near the imaging side S6 of the third lens E3 are spherical surfaces.

Light from an image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 10 shows a surface type, radius of curvature, thickness, material and conic coefficient of each lens of the projection lens according to embodiment 4. Units of the radius of curvature and the thickness are millimeter (mm). Table 11 shows higher-order coefficients applied to each aspheric mirror surface in embodiment 4. The surface type of each aspheric surface is defined by formula (1) given in embodiment 1. Table 12 shows a total effective focal length f of the projection lens, effective focal lengths f1 to f3 of the lenses in embodiment 4, a maximum half field of view HFOV of the projection lens and an object space numerical aperture NA of the projection lens.

TABLE 10

| Surface number | Surface type | Radius of curvature | Thickness | Material Refractive index | Material Abbe number | Conic coefficient |
|---|---|---|---|---|---|---|
| OBJ | Spherical | Infinite | 0.4700 | | | |
| S1 | Aspheric | 0.8238 | 0.7858 | 1.63 | 20.4 | 0.1638 |
| S2 | Aspheric | 1.0212 | 0.8149 | | | 0.3092 |
| S3 | Aspheric | −0.5111 | 0.2800 | 1.63 | 20.4 | −3.9809 |
| S4 | Aspheric | −0.7742 | 0.6603 | | | −10.1390 |
| S5 | Spherical | −1.4435 | 0.4890 | 1.79 | 41.0 | |
| S6 | Spherical | −1.0159 | −0.3000 | | | |
| STO | Spherical | Infinite | 700.0000 | | | |
| IMA | Spherical | Infinite | | | | |

TABLE 11

| Surface number | A4 | A6 | A8 | A10 | A12 | A14 | A16 |
|---|---|---|---|---|---|---|---|
| S1 | 1.6697E−01 | 4.0416E−02 | −6.2570E+00 | 4.9114E+01 | −1.7095E+02 | 2.9038E+02 | −1.9834E+02 |
| S2 | 6.3221E−01 | 1.6250E+01 | −3.5764E+02 | 5.5147E+03 | −4.5326E+04 | 1.9875E+05 | −3.4862E+05 |
| S3 | −1.6539E+00 | 2.0888E+01 | −6.9103E+01 | 1.1608E+02 | −1.0780E+02 | 5.1813E+01 | −9.9543E+00 |
| S4 | −1.6070E+00 | 2.0394E+01 | −1.2388E+02 | 7.2683E+02 | −2.8759E+03 | 6.3796E+03 | −5.9302E+03 |

TABLE 12

| Parameter | f(mm) | f1(mm) | f2(mm) | f3(mm) | HFOV(°) | NA |
|---|---|---|---|---|---|---|
| Numerical value | 4.00 | 2.65 | −4.04 | 2.88 | 7.9 | 0.18 |

Figure 8A:
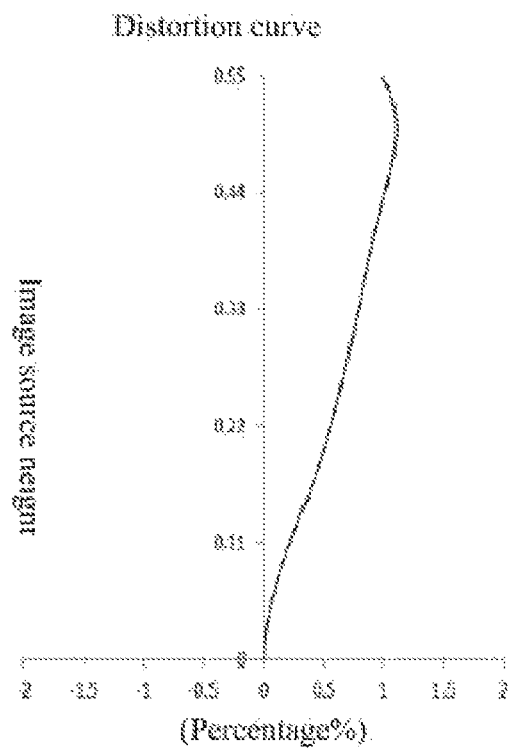
FIG. 8A to FIG. 8B illustrate a distortion curve and relative illumination curve of the projection lens according to embodiment 4 respectively.
Figure 8B:
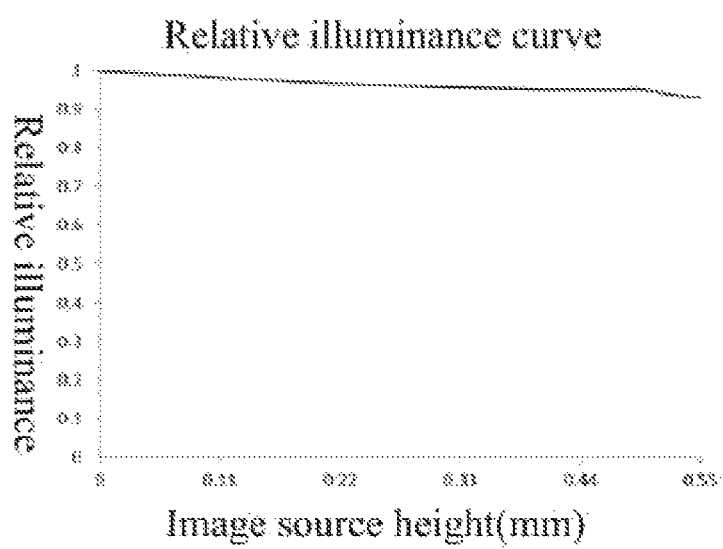

FIG. 8A illustrates a distortion curve of the projection lens according to embodiment 4 to represent a distortion value under different viewing angles. FIG. 8B illustrates a relative illumination curve of the projection lens according to embodiment 4 to represent relative illuminance corresponding to different image heights on an imaging surface. According to FIG. 8A and FIG. 8B, it can be seen that the projection lens provided in embodiment 4 achieves high imaging quality.

Embodiment 5

Figure 9:
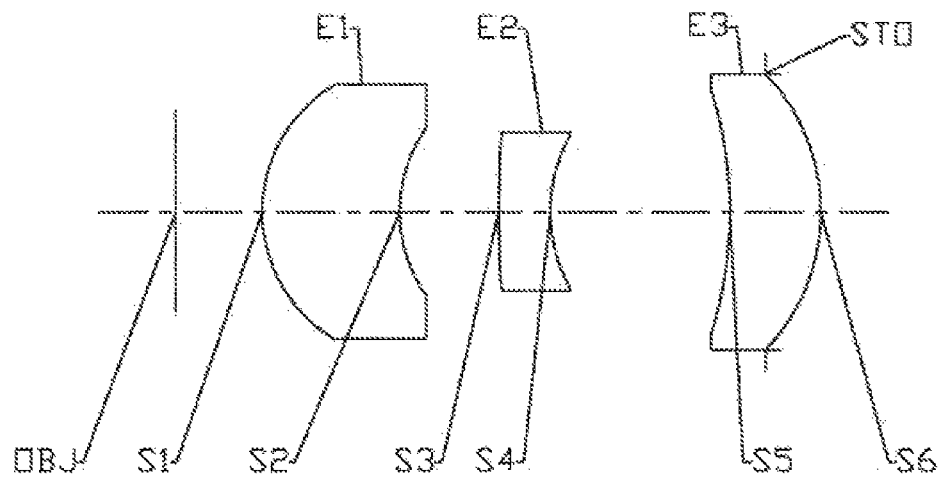
FIG. 9 is a structure diagram of a projection lens according to embodiment 5 of the disclosure.

A projection lens according to embodiment 9 of the disclosure will be described below with reference to FIG. 9 to FIG. 10B. FIG. 9 is a structure diagram of a projection lens according to embodiment 5 of the disclosure.

As shown in FIG. 9, the projection lens according to the exemplary implementation mode of the disclosure a first lens E1, a second lens E2, a third lens E3 and a diaphragm STO which are provided in sequence from an image source side to an imaging side along an optical axis.

The first lens E1 has a positive refractive power, a surface near the image source side S1 thereof is a convex surface, a surface near the imaging side S2 is a concave surface, and both the surface near the image source side S1 and surface near the imaging side S2 of the first lens E1 are aspheric surfaces.

The second lens E2 has a negative refractive power, a surface near the image source side S3 thereof is a convex surface, a surface near the imaging side S4 is a concave surface, and both the surface near the image source side S3 and surface near the imaging side S4 of the second lens E2 are aspheric surfaces.

The third lens E3 has a positive refractive power, a surface near the image source side S5 thereof is a concave surface, a surface near the imaging side S6 is a convex surface, the surface near the image source side S5 of the third lens E3 is a spherical surface, and the surface near the imaging side S6 is an aspheric surface.

Light from an image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 13 shows a surface type, radius of curvature, thickness, material and conic coefficient of each lens of the projection lens according to embodiment 5. Units of the radius of curvature and the thickness are millimeter (mm). Table 14 shows higher-order coefficients applied to each aspheric mirror surface in embodiment 5. The surface type of each aspheric surface is defined by formula (1) given in embodiment 1. Table 15 shows a total effective focal length f of the projection lens, effective focal lengths f1 to f3 of the lenses in embodiment 5, a maximum half field of view HFOV of the projection lens and an object space numerical aperture NA of the projection lens.

TABLE 13

| Surface number | Surface type | Radius of curvature | Thickness | Material Refractive index | Abbe number | Conic coefficient |
|---|---|---|---|---|---|---|
| OBJ | Spherical | Infinite | 0.4700 | | | |
| S1 | Aspheric | 0.9758 | 0.7451 | 1.63 | 20.4 | 0.6881 |
| S2 | Aspheric | 1.7548 | 0.5368 | | | 0.0000 |
| S3 | Aspheric | 100.0000 | 0.2800 | 1.63 | 20.4 | −17.6923 |
| S4 | Aspheric | 1.0317 | 0.9745 | | | −3.2087 |
| S5 | Spherical | −2.2004 | 0.4935 | 1.79 | 41.0 | |
| S6 | Aspheric | −1.0686 | −0.3000 | | | −0.1000 |
| STO | Spherical | Infinite | 700.0000 | | | |
| IMA | Spherical | Infinite | | | | |

TABLE 14

| Surface number | A4 | A6 | A8 | A10 | A12 | A14 | A16 |
|---|---|---|---|---|---|---|---|
| S1 | 2.5726E−01 | 1.6780E+00 | −1.6926E+01 | 8.2251E+01 | −2.3388E+02 | 3.5822E+02 | −2.2847E+02 |
| S2 | 1.1223E+00 | 5.7240E+00 | −9.8574E+01 | 1.5648E+03 | −1.2401E+04 | 4.8386E+04 | −7.1410E+04 |
| S3 | 9.2603E−01 | −8.3332E−01 | −1.6711E+01 | 4.3270E+01 | −3.5833E+01 | 1.5093E+00 | 6.8988E+00 |
| S4 | 1.5415E+00 | −2.1816E+00 | −9.3646E+00 | 1.4328E+02 | −1.7790E+03 | 9.6385E+03 | −1.7981E+04 |
| S6 | 0.0000E+00 | 0.0000E+00 | 0.0000E+00 | 0.0000E+00 | 0.0000E+00 | 0.0000E+00 | 0.0000E+00 |

TABLE 15

| Parameter | f(mm) | f1(mm) | f2(mm) | f3(mm) | HFOV(°) | NA |
|---|---|---|---|---|---|---|
| Numerical value | 4.15 | 2.53 | −1.65 | 2.20 | 7.6 | 0.18 |

Figure 10A:
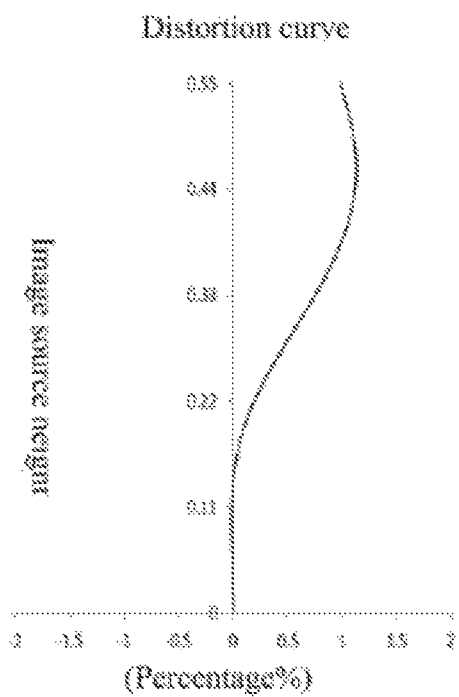
FIG. 10A to FIG. 10B illustrate a distortion curve and relative illumination curve of the projection lens according to embodiment 5 respectively.
Figure 10B:
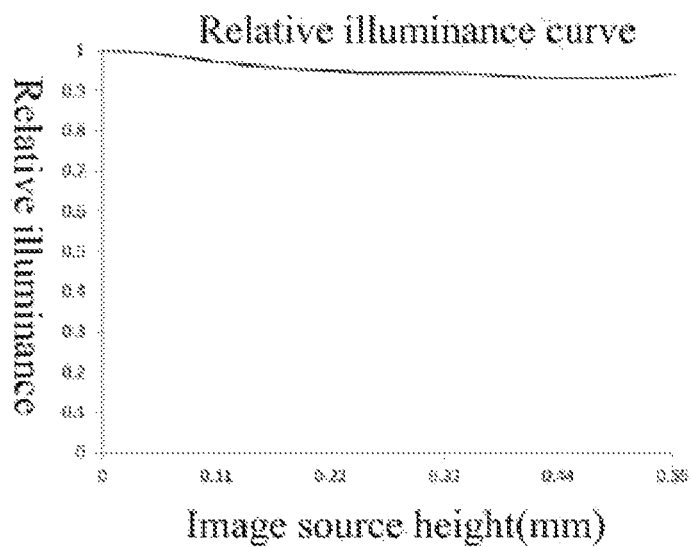

FIG. 10A illustrates a distortion curve of the projection lens according to embodiment 5 to represent a distortion value under different viewing angles. FIG. 10B illustrates a relative illumination curve of the projection lens according to embodiment 5 to represent relative illuminance corresponding to different image heights on an imaging surface. According to FIG. 10A and FIG. 10B, it can be seen that the projection lens provided in embodiment 5 achieves high imaging quality.

Embodiment 6

Figure 11:
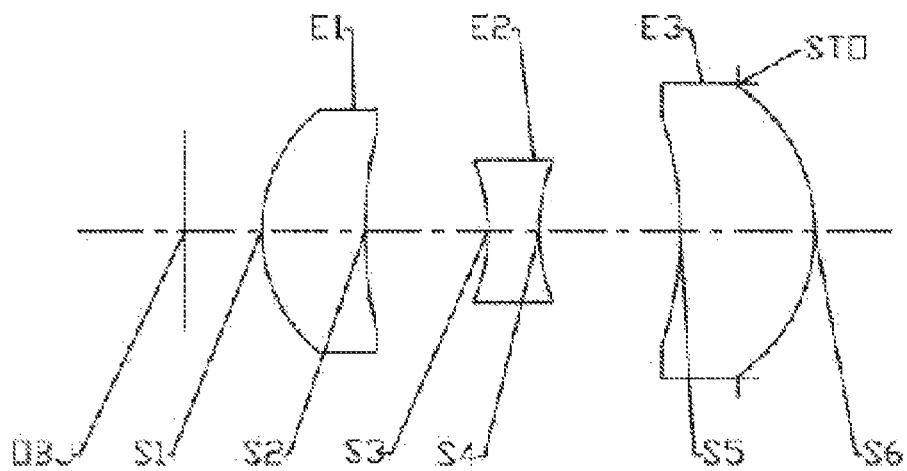
FIG. 11 is a structure diagram of a projection lens according to embodiment 6 of the disclosure.

A projection lens according to embodiment 6 of the disclosure will be described below with reference to FIG. 11 to FIG. 12B. FIG. 11 is a structure diagram of a projection lens according to embodiment 6 of the disclosure.

As shown in FIG. 11, the projection lens according to the exemplary implementation mode of the disclosure a first lens E1, a second lens E2, a third lens E3 and a diaphragm STO which are provided in sequence from an image source side to an imaging side along an optical axis.

The first lens E1 has a positive refractive power, a surface near the image source side S1 thereof is a convex surface, and a surface near the imaging side S2 is a concave surface. The second lens E2 has a negative refractive power, a surface near the image source side S3 thereof is a concave surface, and a surface near the imaging side S4 is a concave surface. The third lens E3 has a positive refractive power, a surface near the image source side S5 thereof is a concave surface, and a surface near the imaging side S6 is a convex surface. Light from an image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 16 shows a surface type, radius of curvature, thickness, material and conic coefficient of each lens of the projection lens according to embodiment 6. Units of the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | Spherical | Infinite | 0.4209 | | | |
| S1 | Aspheric | 1.0342 | 0.5679 | 1.62 | 23.5 | −0.0621 |
| S2 | Aspheric | 7.6737 | 0.6731 | | | 0.0000 |
| S3 | Aspheric | −1.2270 | 0.2800 | 1.63 | 20.4 | −38.4560 |
| S4 | Aspheric | 1.2215 | 0.7742 | | | −1.3158 |
| S5 | Aspheric | −2.7467 | 0.7349 | 1.63 | 20.4 | 2.2804 |
| S6 | Aspheric | −0.9730 | −0.4134 | | | −0.3383 |
| STO | Spherical | Infinite | 700.0000 | | | |
| IMA | Spherical | Infinite | | | | |

From Table 16, it can be seen that, in embodiment 6, both the surface near the image source side and surface near the imaging side of any lens in the first lens E1 to the third lens E3 are aspheric surfaces. Table 17 shows higher-order coefficients applied to each aspheric mirror surface in embodiment 6. The surface type of each aspheric surface is defined by formula (1) given in embodiment 1.

TABLE 17

| Surface number | A4 | A6 | A8 | A10 | A12 | A14 | A16 |
|---|---|---|---|---|---|---|---|
| S1 | 3.5585E−01 | 1.0821E−01 | −7.5441E+00 | 5.5646E+01 | −1.8605E+02 | 3.0848E+02 | −1.9954E+02 |
| S2 | 2.8387E−01 | 1.1861E+00 | −2.1432E+01 | 2.1541E+02 | −1.0895E+03 | 2.7854E+03 | −2.7894E+03 |
| S3 | −3.0789E+00 | 2.8204E+01 | −3.4321E+02 | 3.1519E+03 | −1.9606E+04 | 7.0687E+04 | −1.0974E+05 |
| S4 | 3.5630E−01 | 2.5123E+00 | −5.0125E+01 | 7.0174E+02 | −5.1555E+03 | 1.9191E+04 | −2.7220E+04 |
| S5 | −6.6418E−02 | −9.3981E−02 | −9.9774E−01 | 9.5321E+00 | −4.5191E+01 | 9.7618E+01 | −8.5088E+01 |
| S6 | −3.9457E−02 | 6.1801E−02 | −8.5732E−01 | 3.4260E+00 | −7.8876E+00 | 9.1688E+00 | −4.4784E+00 |

Table 18 shows a total effective focal length f of the projection lens, effective focal lengths f1 to f3 of the lenses in embodiment 6, a maximum half field of view HFOV of the projection lens and an object space numerical aperture NA of the projection lens.

TABLE 18

| Parameter | f(mm) | f1(mm) | f2(mm) | f3(mm) | HFOV(°) | NA |
|---|---|---|---|---|---|---|
| Numerical value | 4.49 | 1.87 | −0.92 | 2.04 | 7.0 | 0.18 |

Figure 12A:
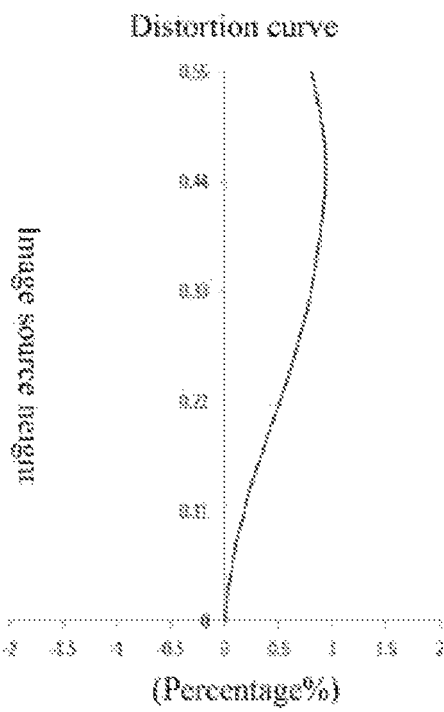
FIG. 12A to FIG. 12B illustrate a distortion curve and relative illumination curve of the projection lens according to embodiment 6 respectively.
Figure 12B:
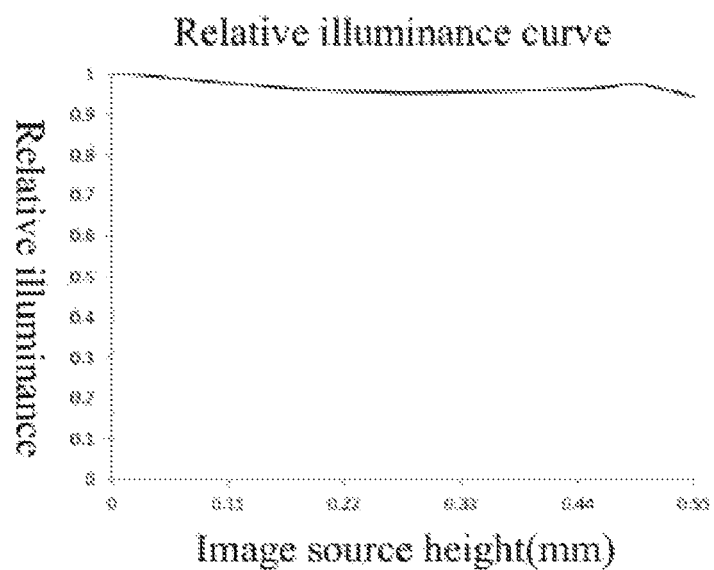

FIG. 12A illustrates a distortion curve of the projection lens according to embodiment 6 to represent a distortion value under different viewing angles. FIG. 12B illustrates a relative illumination curve of the projection lens according to embodiment 6 to represent relative illuminance corresponding to different image heights on an imaging surface. According to FIG. 12A and FIG. 12B, it can be seen that the projection lens provided in embodiment 6 achieves high imaging quality.

Embodiment 7

Figure 13:
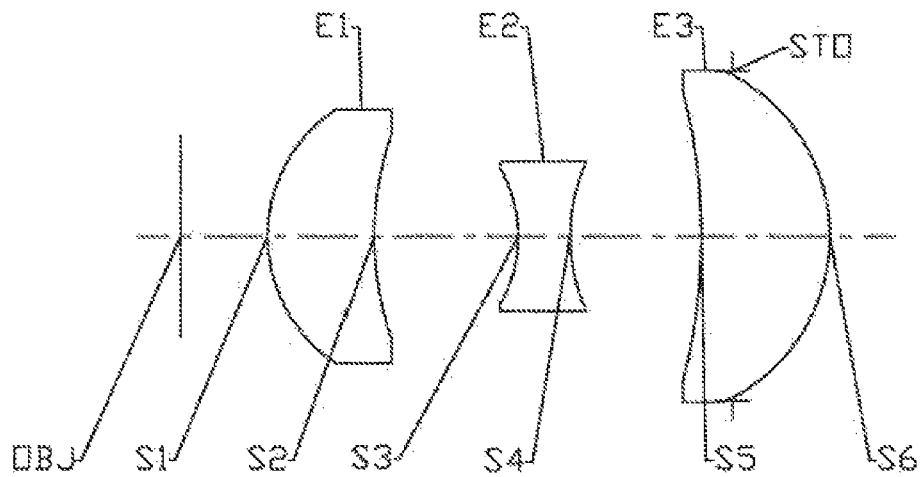
FIG. 13 is a structure diagram of a projection lens according to embodiment 7 of the disclosure.

A projection lens according to embodiment 13 of the disclosure will be described below with reference to FIG. 13 to FIG. 14. FIG. 13 is a structure diagram of a projection lens according to embodiment 7 of the disclosure.

As shown in FIG. 13, the projection lens according to the exemplary implementation mode of the disclosure includes a first lens E1, a second lens E2, a third lens E3 and a diaphragm STO which are provided in sequence from an image source side to an imaging side along an optical axis.

The first lens E1 has a positive refractive power, a surface near the image source side S1 thereof is a convex surface, and a surface near the imaging side S2 is a concave surface. The second lens E2 has a negative refractive power, a surface near the image source side S3 thereof is a concave surface, and a surface near the imaging side S4 is a concave surface. The third lens E3 has a positive refractive power, a surface near the image source side S5 thereof is a concave surface, and a surface near the imaging side S6 is a convex surface. Light from an image source surface OBJ sequentially penetrates through each of the surfaces S1 to S6 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 19 shows a surface type, radius of curvature, thickness, material and conic coefficient of each lens of the projection lens according to embodiment 7. Units of the radius of curvature and the thickness are millimeter (mm).

TABLE 19

| Surface number | Surface type | Radius of curvature | Thickness | Material Refractive index | Material Abbe number | Conic coefficient |
|---|---|---|---|---|---|---|
| OBJ | Spherical | Infinite | 0.4700 | | | |
| S1 | Aspheric | 0.9900 | 0.5676 | 1.62 | 23.5 | 0.1123 |
| S2 | Aspheric | 4.6633 | 0.7783 | | | −0.0864 |
| S3 | Aspheric | −0.8170 | 0.2800 | 1.63 | 20.4 | 1.5309 |
| S4 | Aspheric | 1.1835 | 0.7092 | | | 0.6639 |
| S5 | Aspheric | −3.8348 | 0.6949 | 1.63 | 20.4 | −1.8808 |
| S6 | Aspheric | −0.9529 | −0.5253 | | | −0.3380 |
| STO | Spherical | Infinite | 700.0000 | | | |
| IMA | Spherical | Infinite | | | | |

From Table 19, it can be seen that, in embodiment 7, both the surface near the image source side and surface near the imaging side of any lens in the first lens E1 to the third lens E3 are aspheric surfaces. Table 20 shows higher-order coefficients applied to each aspheric mirror surface in embodiment 7. The surface type of each aspheric surface is defined by formula (1) given in embodiment 1.

TABLE 20

| Surface number | A4 | A6 | A8 | A10 | A12 | A14 | A16 |
|---|---|---|---|---|---|---|---|
| S1 | 3.6665E−01 | 7.1876E−02 | −1.1553E+01 | 9.0243E+01 | −3.0889E+02 | 5.1604E+02 | −3.3432E+02 |
| S2 | 2.1730E−01 | 4.7081E+00 | −7.7795E+01 | 7.2980E+02 | −3.6290E+03 | 9.2695E+03 | −9.3856E+03 |
| S3 | −8.7775E−14 | 9.7406E−12 | −3.9537E−10 | 7.7880E−09 | −8.0104E−08 | 4.1377E−07 | −8.4744E−07 |
| S4 | 4.5656E−01 | 1.0651E+00 | −1.7196E+01 | 2.8099E+02 | −2.1539E+03 | 7.7756E+03 | −1.0323E+04 |
| S5 | −3.7216E−02 | −2.1248E−01 | 1.4819E+00 | −5.7165E+00 | 1.1906E+01 | −1.2614E+01 | 5.3694E+00 |
| S6 | −3.3606E−02 | −2.3352E−02 | −1.3803E−01 | 5.2300E−01 | −1.2156E+00 | 1.2708E+00 | −5.5931E−01 |

Table 21 shows a total effective focal length f of the projection lens in embodiment 7, effective focal lengths f1 to f3 of the lenses, a maximum half field of view HFOV of the projection lens and an object space numerical aperture NA of the projection lens.

TABLE 21

| Parameter | f(mm) | f1(mm) | f2(mm) | f3(mm) | HFOV(°) | NA |
|---|---|---|---|---|---|---|
| Numerical value | 5.00 | 1.92 | −0.72 | 1.83 | 6.3 | 0.18 |

Figure 14A:
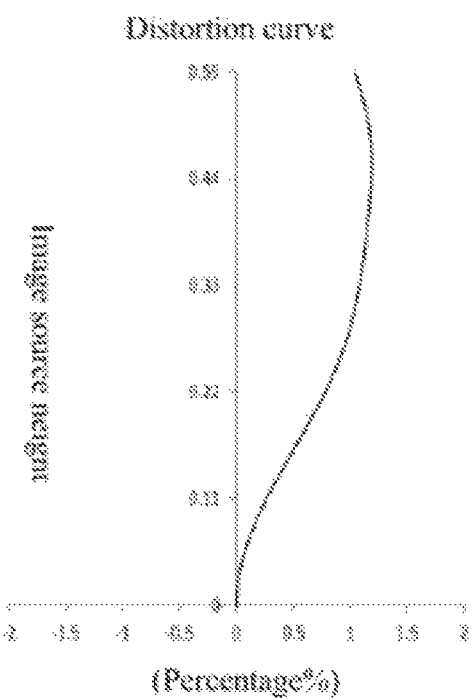
FIG. 14A to FIG. 14B illustrate a distortion curve and relative illumination curve of the projection lens according to embodiment 7 respectively.
Figure 14B:
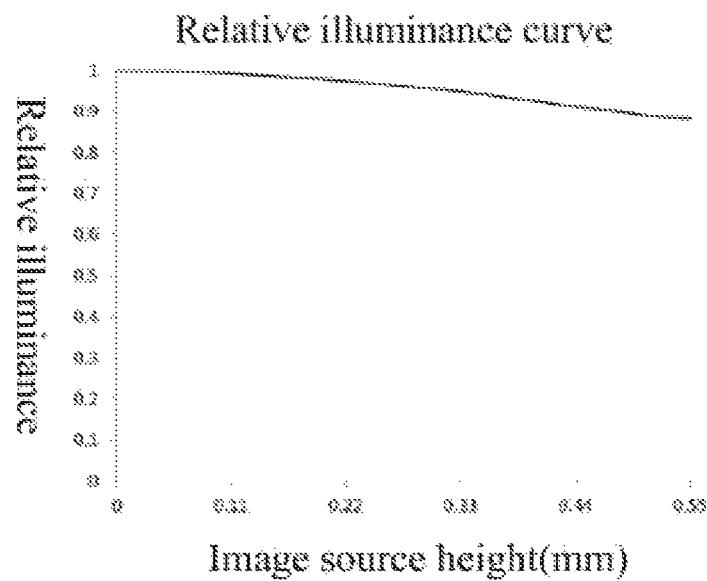

FIG. 14A illustrates a distortion curve of the projection lens according to embodiment 7 to represent a distortion value under different viewing angles. FIG. 14B illustrates a relative illumination curve of the projection lens according to embodiment 7 to represent relative illuminance corresponding to different image heights on an imaging surface. According to FIG. 14A and FIG. 14B, it can be seen that the projection lens provided in embodiment 7 achieves high imaging quality.

Embodiment 8

Figure 15:
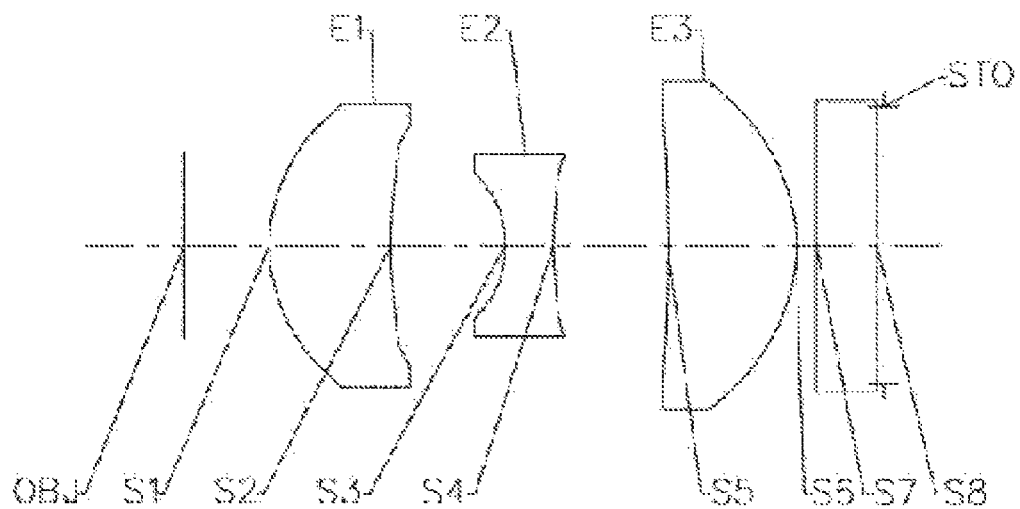
FIG. 15 is a structure diagram of a projection lens according to embodiment 8 of the disclosure.

A projection lens according to embodiment 15 of the disclosure will be described below with reference to FIG. 15 to FIG. 16B. FIG. 15 is a structure diagram of a projection lens according to embodiment 8 of the disclosure.

As shown in FIG. 15, the projection lens according to the exemplary implementation mode of the disclosure includes a first lens E1, a second lens E2, a third lens E3, an optical filter E4 and a diaphragm STO which are provided in sequence from an image source side to an imaging side along an optical axis.

The first lens E1 has a positive refractive power, a surface near the image source side S1 thereof is a convex surface, and a surface near the imaging side S2 is a concave surface. The second lens E2 has a negative refractive power, a surface near the image source side S3 thereof is a concave surface, and a surface near the imaging side S4 is a concave surface. The third lens E3 has a positive refractive power, a surface near the image source side S5 thereof is a concave surface, and a surface near the imaging side S6 is a convex surface. The optical filter E4 has a surface near the image source side S7 and a surface near the imaging side S8. Light from an image source surface OBJ sequentially penetrates through each of the surfaces S1 to S8 and, after passing through, for example, a DOE (not shown), is projected to a target object in a space.

A practically used wavelength λ of the projection lens of the embodiment floats based on a wavelength range of a used light source, a minimum wavelength of the practically used wavelength λ is about 0 nm to 100 nm less than a minimum wavelength of the used light source, and a maximum wavelength of the practically used wavelength λ is about 0 nm to 100 nm greater than a maximum wavelength of the used light source. The used light source of the projection lens of the embodiment may be any monochromatic source band, for example, an infrared single-wavelength band.

Table 22 shows a surface type, radius of curvature, thickness, material and conic coefficient of each lens of the projection lens according to embodiment 8. Units of the radius of curvature and the thickness are millimeter (mm).

TABLE 22

| Surface number | Surface type | Radius of curvature | Thickness | Refractive index | Abbe number | Conic coefficient |
|---|---|---|---|---|---|---|
| OBJ | Spherical | Infinite | 0.4200 | | | |
| S1 | Aspheric | 0.8000 | 0.6004 | 1.68 | 53.2 | −1.8720 |
| S2 | Aspheric | 2.2518 | 0.5626 | | | −42.7080 |
| S3 | Aspheric | −0.6445 | 0.2400 | 1.60 | 23.5 | 0.0000 |
| S4 | Aspheric | 1.9269 | 0.5631 | | | −13.4945 |
| S5 | Aspheric | −16.1774 | 0.6339 | 1.62 | 23.5 | 0.0000 |
| S6 | Aspheric | −0.9201 | 0.1000 | | | −1.7997 |
| S7 | Spherical | Infinite | 0.3000 | 1.51 | 64.2 | |
| S8 | Spherical | Infinite | 0.0300 | | | |
| STO | Spherical | Infinite | 300.0000 | | | |
| IMA | Spherical | Infinite | | | | |

From Table 22, it can be seen that, in embodiment 8, both the surface near the image source side and surface near the imaging side of any lens in the first lens E1 to the third lens E3 are aspheric surfaces. Table 23 shows higher-order coefficients applied to each aspheric mirror surface in embodiment 8. The surface type of each aspheric surface is defined by formula (1) given in embodiment 1.

TABLE 23

| Surface number | A4 | A6 | A8 | A10 | A12 | A14 | A16 |
|---|---|---|---|---|---|---|---|
| S1 | 2.5883E−01 | −2.1675E−02 | 3.9916E−01 | −1.9197E+00 | 5.6283E+00 | −8.0736E+00 | 4.3096E+00 |
| S2 | 9.1714E−02 | 1.1579E−01 | −1.9862E+00 | 1.0414E+01 | −2.9915E+01 | 4.0887E+01 | −2.0835E+01 |
| S3 | 1.2031E+00 | −1.0351E+01 | 1.5775E+00 | 4.8766E+02 | −5.0090E+03 | 2.0579E+04 | −2.9581E+04 |
| S4 | 3.0952E+00 | 2.0312E+01 | −8.3680E+02 | 1.5805E+04 | −1.6019E+05 | 8.1085E+05 | −1.6767E+06 |
| S5 | 3.9529E−02 | −3.0904E+00 | 4.7452E+01 | −3.4083E+02 | 1.6997E+03 | −5.2324E+03 | 6.2586E+03 |
| S6 | −2.0484E−01 | −1.1995E+00 | 3.1234E+00 | −9.6785E+00 | 1.0359E+02 | −4.0067E+02 | 4.4798E+02 |

Table 24 shows a total effective focal length f of the projection lens in embodiment 8, effective focal lengths f1 to f3 of the lenses, a maximum half field of view HFOV of the projection lens and an object space numerical aperture NA of the projection lens.

TABLE 24

| Parameter | f(mm) | f1(mm) | f2(mm) | f3(mm) | HFOV(°) | NA |
|---|---|---|---|---|---|---|
| Numerical value | 3.70 | 1.56 | −0.76 | 1.56 | 7.1 | 0.18 |

Figure 16A:
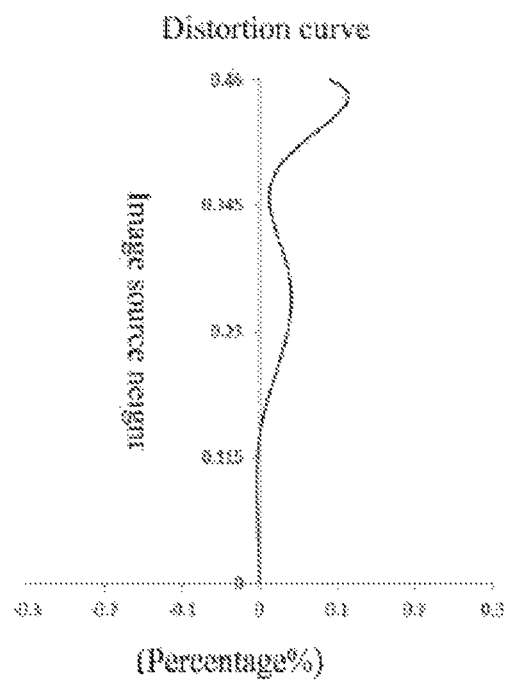
FIG. 16A to FIG. 16B illustrate a distortion curve and relative illumination curve of the projection lens according to embodiment 8 respectively.
Figure 16B:
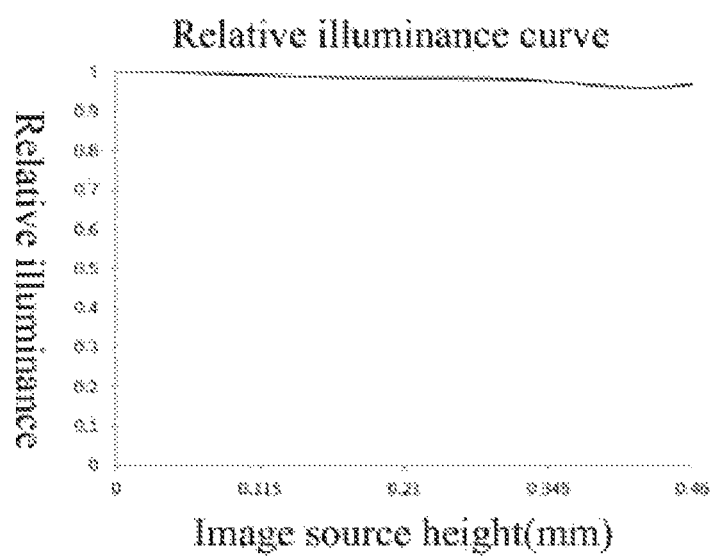

FIG. 16A illustrates a distortion curve of the projection lens according to embodiment 8 to represent a distortion value under different viewing angles. FIG. 16B illustrates a relative illumination curve of the projection lens according to embodiment 8 to represent relative illuminance corresponding to different image heights on an imaging surface. According to FIG. 16A and FIG. 16B, it can be seen that the projection lens provided in embodiment 8 achieves high imaging quality.

From the above, embodiment 1 to embodiment 8 meet a relationship shown in Table 25 respectively.

TABLE 25

| Conditional expression | embodiment | | | | | | | |
| | 1 | 2 | 3 | 4 | 5 | 6 | 7 | 8 |
|---|---|---|---|---|---|---|---|---|
| R6/f | −0.22 | −0.24 | −0.27 | −0.25 | −0.26 | −0.22 | −0.19 | −0.25 |
| NA | 0.18 | 0.18 | 0.22 | 0.18 | 0.18 | 0.18 | 0.18 | 0.18 |
| f3/f | 0.57 | 0.52 | 0.58 | 0.72 | 0.53 | 0.45 | 0.37 | 0.42 |
| ImgH/f | 0.12 | 0.12 | 0.12 | 0.14 | 0.13 | 0.12 | 0.11 | 0.12 |
| tan(CRAmax) + tan(HFOV) | 0.12 | 0.12 | 0.12 | 0.14 | 0.13 | 0.12 | 0.11 | 0.13 |
| (T12 + T23)/Td | 0.43 | 0.41 | 0.38 | 0.49 | 0.50 | 0.48 | 0.49 | 0.43 |
| |(R5 − R6)/(R5 + R6)| | 0.11 | 0.24 | 0.17 | 0.17 | 0.35 | 0.48 | 0.60 | 0.89 |
| CT1/ΣCT | 0.34 | 0.36 | 0.31 | 0.51 | 0.49 | 0.36 | 0.37 | 0.41 |
| SAG31/SAG32 | 0.35 | 0.32 | 0.29 | 0.45 | 0.33 | 0.23 | 0.17 | 0.06 |
| DT11/DT21 | 1.62 | 1.59 | 1.46 | 1.55 | 1.60 | 1.75 | 1.87 | 1.94 |
| (f1 + f3)/f | 0.92 | 0.81 | 0.89 | 1.38 | 1.14 | 0.87 | 0.75 | 0.84 |
| |SAG11/DT11|/|SAG32/DT32| | 0.90 | 1.03 | 0.79 | 1.45 | 1.41 | 0.87 | 0.84 | 0.92 |
| SAG11/SAG32 | −0.71 | −0.85 | −0.53 | −1.38 | −1.29 | −0.71 | −0.64 | −0.80 |
| R1/R6 | −1.00 | −0.82 | −0.91 | −0.81 | −0.91 | −1.06 | −1.04 | −0.87 |

What is claimed is:

1. A projection lens, comprising a first lens, a second lens and a third lens which are provided in sequence from an image source side to an imaging side along an optical axis, wherein the first lens has a positive refractive power, and a surface near the image source side of the first lens is a convex surface;

the second lens has a positive refractive power or a negative refractive power;

the third lens has a positive refractive power and the third lens is a meniscus lens of which a surface near the imaging side is a convex surface; and an image source height ImgH of the projection lens and a total effective focal length f of the projection lens meet ImgH/f<0.2;

a maximum incident angle CRAmax of a primary ray of the projection lens and a maximum half field of view HFOV of the projection lens meet tan(CRAmax)+tan(HFOV)<0.3.

2. The projection lens as claimed in claim 1, wherein a radius of curvature R6 of the surface near the imaging side of the third lens and the total effective focal length f of the projection lens meet R6/f>−1.

3. The projection lens as claimed in claim 2, wherein a radius of curvature R1 of the surface near the image source side of the first lens and the radius of curvature R6 of the surface near the imaging side of the third lens meet −1.2<R1/R6<−0.8.

4. The projection lens as claimed in claim 1, wherein an effective focal length f3 of the third lens and the total effective focal length f of the projection lens meet 0<f3/f<1.

5. The projection lens as claimed in claim 1, wherein a spacing distance T12 between the first lens and the second lens on the optical axis, a spacing distance T23 between the second lens and the third lens on the optical axis and a spacing distance Td between the surface near the image source side of the first lens and the surface near the imaging side of the third lens on the optical axis meet 0.3<(T12+T23)/Td<0.7.

6. The projection lens as claimed in claim 1, wherein a radius of curvature R5 of a surface near the image source side of the third lens and a radius of curvature R6 of the surface near the imaging side of the third lens meet 0<|(R5−R6)/(R5+R6)|<1.

7. The projection lens as claimed in claim 1, wherein a center thickness CT1 of the first lens on the optical axis and a sum ΣCT of a center thicknesses of the first lens on the optical axis, a center thicknesses of the second lens on the optical axis and a center thicknesses of the third lens on the optical axis meet 0.25<CT1/ΣCT<0.6.

8. The projection lens as claimed in claim 1, wherein a SAG11 and a SAG32 meet −1.5<SAG11/SAG32<−0.5, the SAG11 is an on-axis distance from an intersection of the surface near the image source side of the first lens and the optical axis to a maximum effective semi-diameter vertex of the surface near the image source side of the first lens, the SAG32 is an from an on-axis distance from an intersection of the surface near the imaging side of the third lens and the optical axis to a maximum effective semi-diameter vertex of the surface near the imaging side of the third lens.

9. The projection lens as claimed in claim 1, wherein a SAG11 and a SAG32 meet SAG31/SAG32<0.5, the SAG31 is an on-axis distance from an intersection of a surface near an image source side of the third lens and the optical axis to a maximum effective semi-diameter vertex of the surface near the imaging side of the third lens, the SAG32 is an on-axis distance from an intersection of the surface near the imaging side of the third lens and the optical axis to the maximum effective semi-diameter vertex of the surface near the imaging side of the third lens.

10. The projection lens as claimed in claim 1, wherein a maximum effective semi-diameter DT11 of the surface near the image source side of the first lens and a maximum effective semi-diameter DT21 of a surface near the image source side of the second lens meet 1.2<DT11/DT21<2.

11. The projection lens as claimed in claim 1, wherein an effective focal length f1 of the first lens, an effective focal length f3 of the third lens and the total effective focal length f of the projection lens meet 0.5<(f1+f3)/f<1.5.

12. The projection lens as claimed in claim 1, wherein the projection lens meets 0.5<|SAG11/DT11|/|SAG32/DT32|<1.5, and SAG11 is an on-axis distance from an intersection of the surface near the image source side of the first lens and the optical axis to a maximum effective semi-diameter vertex of the surface near the image source side of the first lens, DT11 is the maximum effective semi-diameter of the surface near the image source side of the first lens, SAG32 is an on-axis distance from an intersection of the surface near the imaging side of the third lens and the optical axis to a maximum effective semi-diameter vertex of the surface near the imaging side of the third lens, and DT32 is the maximum effective semi-diameter of the surface near the imaging side of the third lens.

13. The projection lens as claimed in claim 1, wherein an object space numerical aperture NA of the projection lens meets 0.18≤NA<0.3.

14. The projection lens as claimed in claim 1, wherein a minimum wavelength of a practically used wavelength λ of the projection lens is 0 nm to 100 nm less than a minimum wavelength of a used light source, and a maximum wavelength of the practically used wavelength λ of the projection lens is 0 nm to 100 nm greater than a maximum wavelength of the used light source.

15. The projection lens as claimed in claim 1, wherein a refractive index N2 of the second lens and a refractive index N3 of the third lens meet N2≤N3.

16. A projection lens, comprising a first lens, a second lens and a third lens which are provided in sequence from an image source side to an imaging side along an optical axis, wherein the first lens has a positive refractive power, and a surface near the image source side of the first lens is a convex surface;

the second lens has a negative refractive power;

the third lens has a positive refractive power and is a meniscus lens of which a surface near an imaging side is a convex surface; and a radius of curvature R1 of the surface near the image source side of the first lens and a radius of curvature R6 of the surface near the imaging side of the third lens meet −1.2<R1/R6<−0.8;

a maximum incident angle CRAmax of a primary ray of the projection lens and a maximum half field of view HFOV of the projection lens meet tan(CRAmax)+tan(HFOV)<0.3.

17. The projection lens as claimed in claim 16, wherein a refractive index N2 of the second lens and a refractive index N3 of the third lens meet N2≤N3.

18. The projection lens as claimed in claim 16, wherein an object space numerical aperture NA of the projection lens meets 0.18≤NA<0.3.

19. The projection lens as claimed in claim 16,
wherein the projection lens meets 0.5<|SAG11/DT11|/|SAG32/DT32|<1.5,
and SAG11 is an on-axis distance from an intersection of the surface near the image source side of the first lens and the optical axis to a maximum effective semi-diameter vertex of the surface near the image source side of the first lens,
DT11 is the maximum effective semi-diameter of the surface near the image source side of the first lens,
SAG32 is an on-axis distance from an intersection of the surface near the imaging side of the third lens and the optical axis to a maximum effective semi-diameter vertex of the surface near the imaging side of the third lens, and
DT32 is the maximum effective semi-diameter of the surface near the imaging side of the third lens.

20. The projection lens as claimed in claim 19, wherein the maximum effective semi-diameter DT11 of the surface near the image source side of the first lens and a maximum effective semi-diameter DT21 of a surface near the image source side of the second lens meet 1.2<DT11/DT21<2.

21. The projection lens as claimed in claim 16, wherein an effective focal length f1 of the first lens, an effective focal length f3 of the third lens and a total effective focal length f of the projection lens meet 0.5<(f1+f3)/f<1.5.

* * * * *